(12) United States Patent
Zhou et al.

(10) Patent No.: US 7,804,668 B2
(45) Date of Patent: Sep. 28, 2010

(54) ENHANCED HARD BIAS IN THIN FILM MAGNETORESISTIVE SENSORS WITH PERPENDICULAR EASY AXIS GROWTH OF HARD BIAS AND STRONG SHIELD-HARD BIAS COUPLING

(75) Inventors: Yuchen Zhou, Milpitas, CA (US); Kenichi Takano, Cupertino, CA (US); Kunliang Zhang, Milpitas, CA (US)

(73) Assignee: Headway Technologies, Inc., Milpitas, CA (US)

( * ) Notice: Subject to any disclaimer, the term of this patent is extended or adjusted under 35 U.S.C. 154(b) by 936 days.

(21) Appl. No.: 11/600,380

(22) Filed: Nov. 16, 2006

(65) Prior Publication Data

US 2008/0117552 A1 May 22, 2008

(51) Int. Cl.
 *G11B 5/39* (2006.01)
(52) U.S. Cl. .................................. 360/324.12
(58) Field of Classification Search .............. 360/324.12
 See application file for complete search history.

(56) References Cited

U.S. PATENT DOCUMENTS

| | | | |
|---|---|---|---|
| 5,729,410 | A | 3/1998 | Fontana, Jr. et al. |
| 6,144,534 | A | 11/2000 | Xue et al. |
| 6,185,081 | B1 | 2/2001 | Simion et al. |
| 6,858,320 | B2 | 2/2005 | Takenoiri et al. |
| 7,061,731 | B2 | 6/2006 | Larson et al. |
| 7,072,156 | B2 | 7/2006 | Cyrille et al. |
| 2005/0066514 | A1 | 3/2005 | Chau et al. |
| 2005/0164039 | A1 | 7/2005 | Marinero et al. |
| 2005/0237677 | A1 | 10/2005 | Shimazawa et al. |
| 2006/0087772 | A1 | 4/2006 | Pinarbasi |
| 2006/0114622 | A1 | 6/2006 | Gill |
| 2006/0132989 | A1 | 6/2006 | Zhang et al. |

OTHER PUBLICATIONS

"Commercial TMR Heads for Hard Disk Drives : Characterization and Extendibility at 300 Gbit/in$^2$", by Sining Mao et al., IEEE Trans. on Magnetics, vol. 42, No. 2, Feb. 2006, pp. 97-102.

(Continued)

*Primary Examiner*—Craig A. Renner
(74) *Attorney, Agent, or Firm*—Saile Ackerman LLC; Stephen B. Ackerman

(57) ABSTRACT

A hard bias (HB) structure for longitudinally biasing a free layer in a MR sensor is disclosed that is based on HB easy axis growth perpendicular to an underlying seed layer which is formed above a substrate and along two sidewalls of the sensor. In one embodiment, a conformal soft magnetic layer that may be a top shield contacts the HB layer to provide direct exchange coupling that compensates HB surface charges. Optionally, a thin capping layer on the HB layer enables magneto-static shield-HB coupling. After HB initialization, HB regions along the sensor sidewalls have magnetizations that are perpendicular to the sidewalls as a result of surface charges near the seed layer. Sidewalls may be extended into the substrate (bottom shield) to give enhanced protection against side reading. The top surface of the seed layer may be amorphous or crystalline to promote HB easy axis perpendicular growth.

15 Claims, 13 Drawing Sheets

OTHER PUBLICATIONS

"A Performance Study of Next Generation's TMR Heads Beyond 200 Gb/in$^2$", by Takeo Kagami et al., IEEE Trans. on Magnetics, vol. 42, No. 2, Feb. 2006, pp. 93-96.

"Seedlayer and Preheating Effects on Crystallography and Recording Performance of CoCrP+B Perpendicular Media", by Min Zhang et al., IEEE Trans. on Magnetics, vol. 38, No. 5, Sep. 2002, pp. 1979-1981.

"Microstructure Improvement of Thin Ru Underlayer for CoCrPt-SiO$_2$ Granular Perpendicular Media", by Ryoichi Muka, et al., IEEE Trans. on Magnetics, vol. 41, No. 10, Oct. 2005, pp. 3169-3171.

"Effects of Tb/Pt/Ru underlayer on microstructure and magnetic properties of CoPtCr-SiO$_2$ perpendicular media", by David Vokoun et al., Journal of Appl. Physics 99, 08E703-1 to -3, 2006 Am. Inst. of Phys.

Physical Review Letters, vol. 35, No. 21, Apr. 24, 1975, "Random-Field Instability of the Ordered State of Continuous Symmetry*," by Yoseph Imry et al., pp. 1399-1401.

"Grain Size Dependence of Coercivity and Permeability in Nanocrystalline Ferromagnets", by G. Herzer, IEEE Trans. on Magnetics, vol. 26, No. 5, Sep. 1990, pp. 1397-1402.

*Modern Magnetic Materials, Principles and Applications*, by Robert C. O'Handley, copyright: John Wiley & Sons, Inc; NY, 2000, pp. 337, and pp. 436-437.

"Method for seed and underlayer optimization of perpendicular magnetic recording media", by Erik B. Svedberg et al., J. Vac. Sci Technol. A 20(4), Jul./Aug. 2002, pp. 1341-1346.

"Low Noise Performance of CoCrPt Single-Layer Perpendicular Magnetic Recording Media", by Yoshiyuki Hirayana et al., IEEE Trans. on Magnetics, vol. 36, No. 5, Sep. 2000, pp. 2396-2398.

"Engineering the Microstructure of Thin Films for Perpendicular Recording", by David E. Laughlin et al., IEEE Trans. on Magnetics, vol. 41, No. 2, Feb. 2005, pp. 719-723.

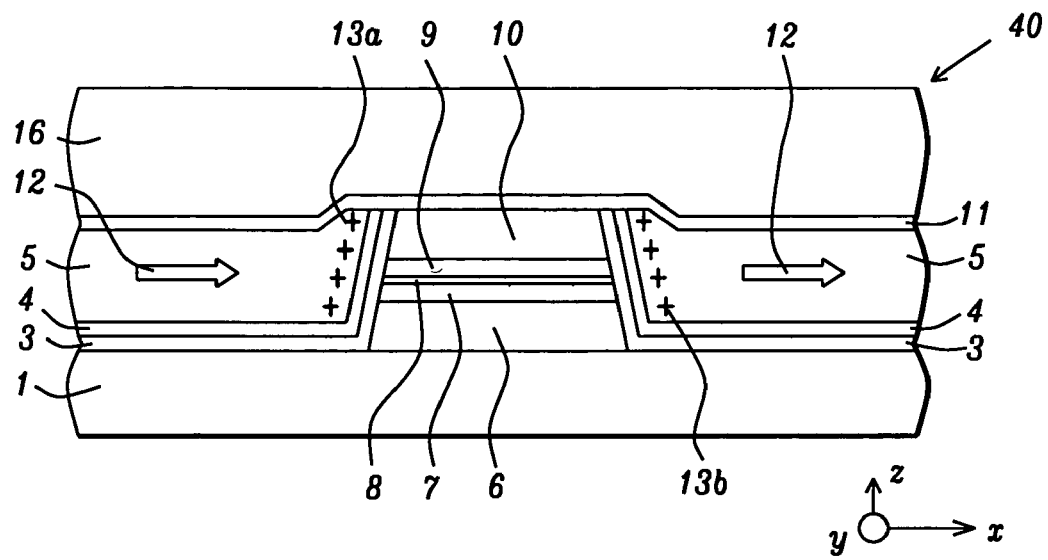
FIG. 1 – Prior Art
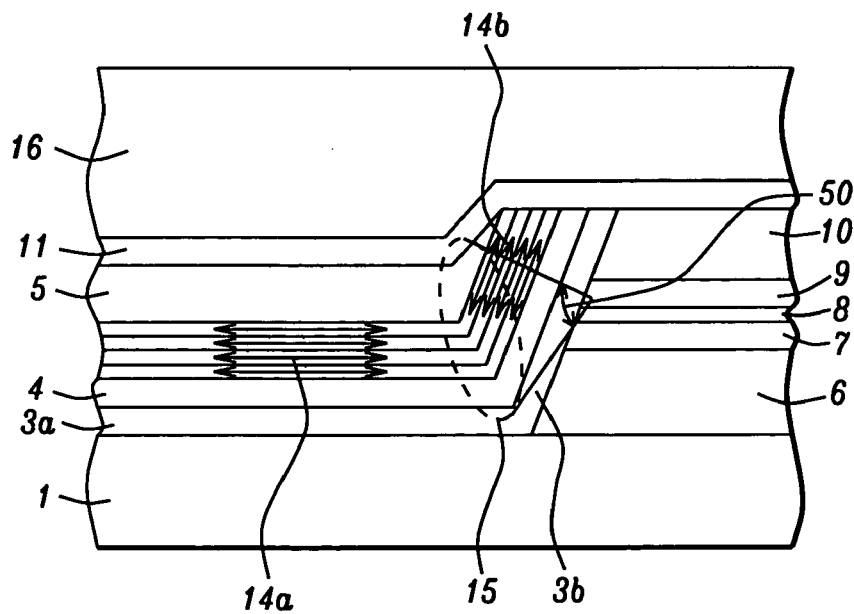
FIG. 2a – Prior Art

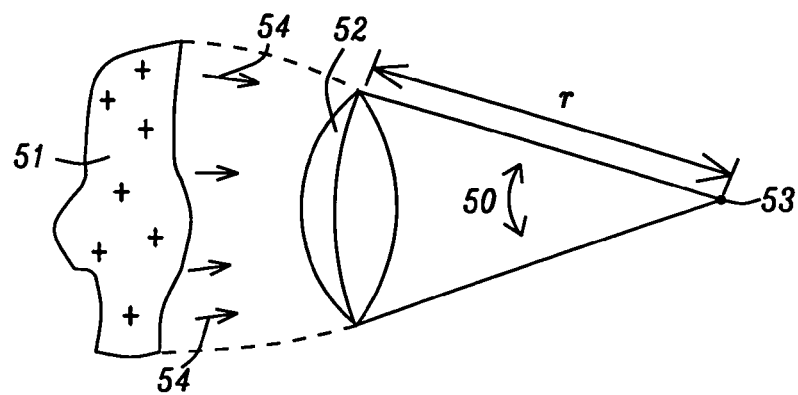
FIG. 2b — Prior Art
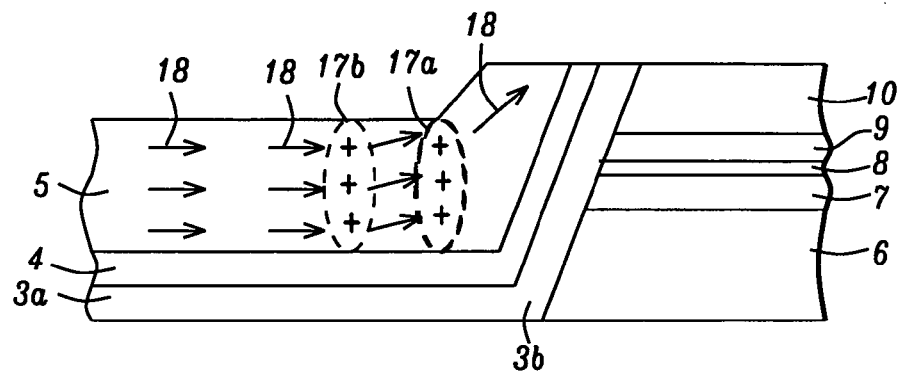
FIG. 3a — Prior Art
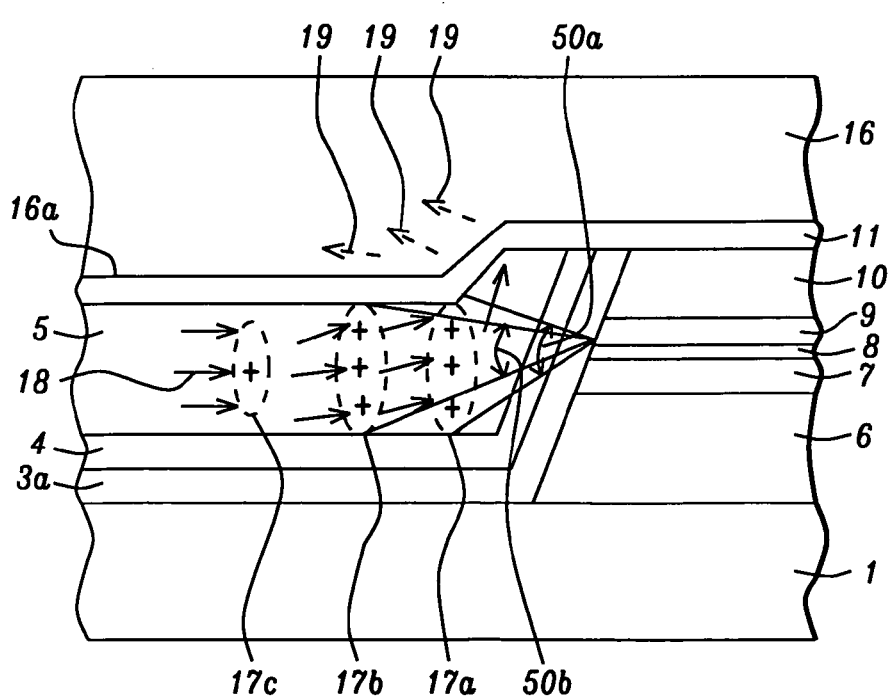
FIG. 3b — Prior Art

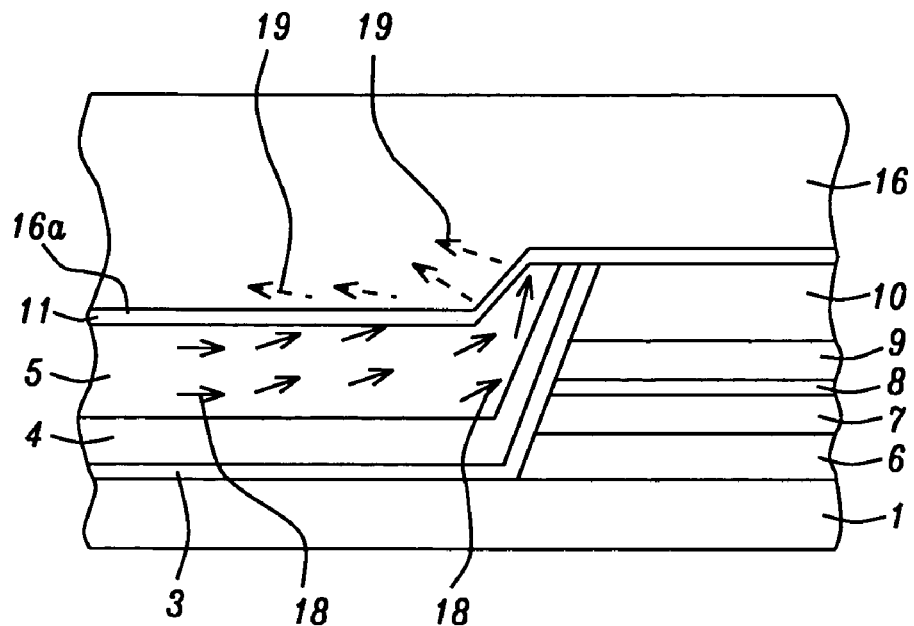
FIG. 4 – Prior Art
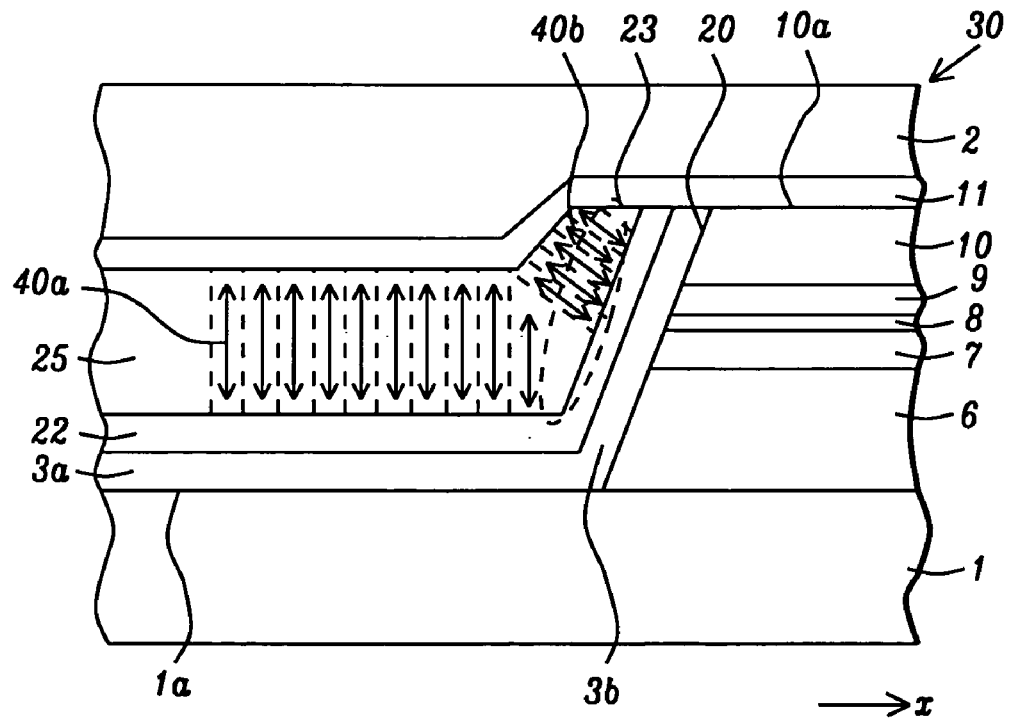
FIG. 5

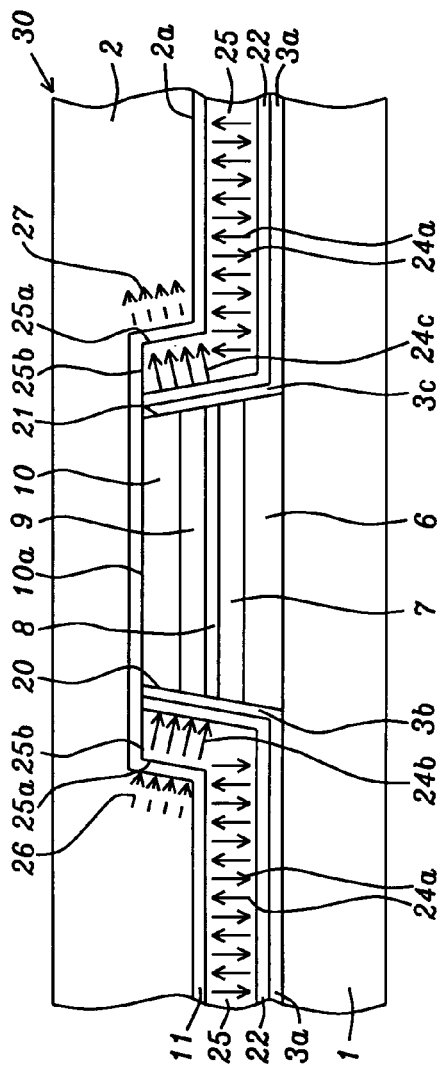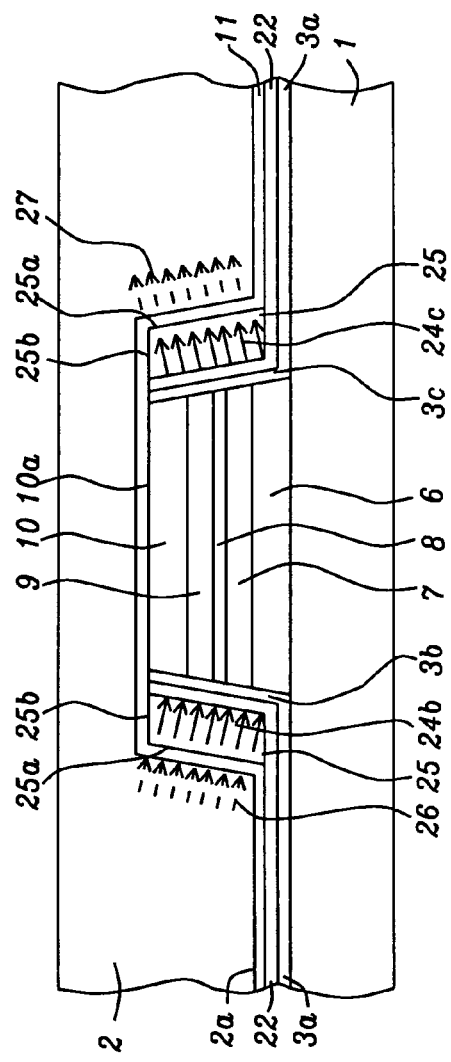

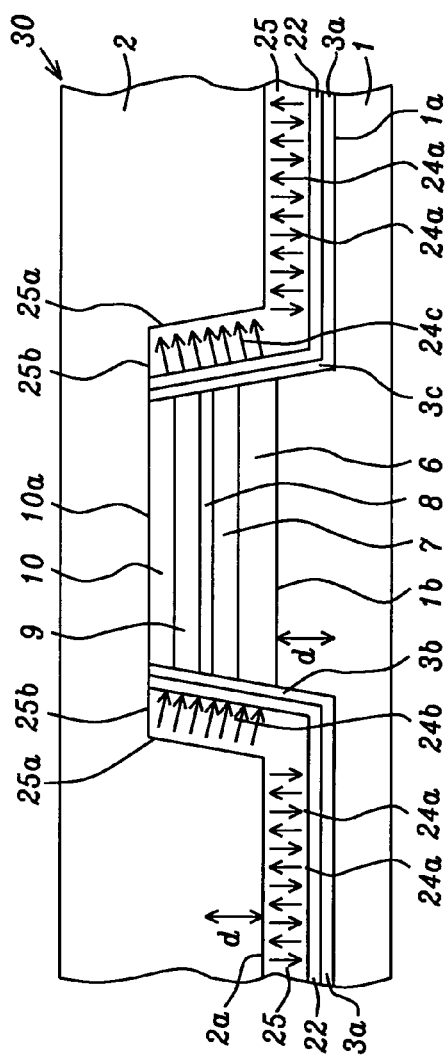
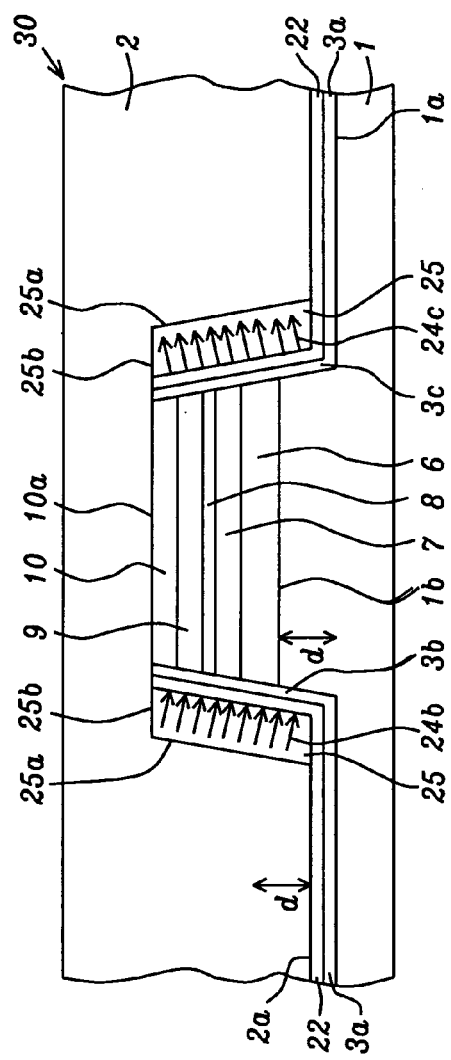

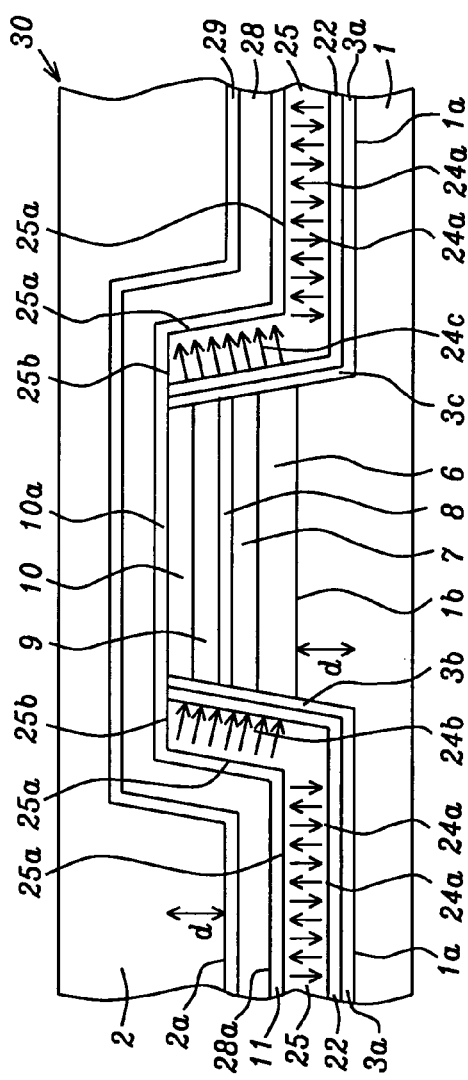
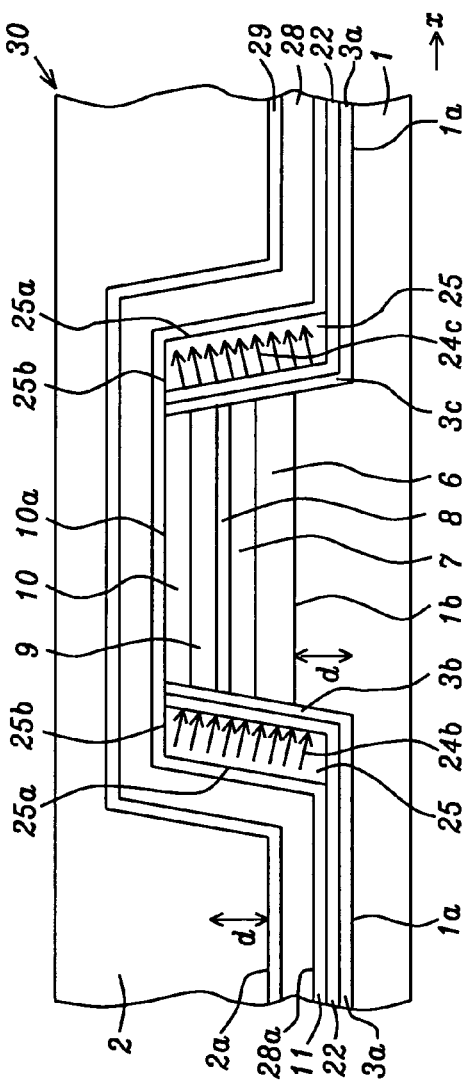

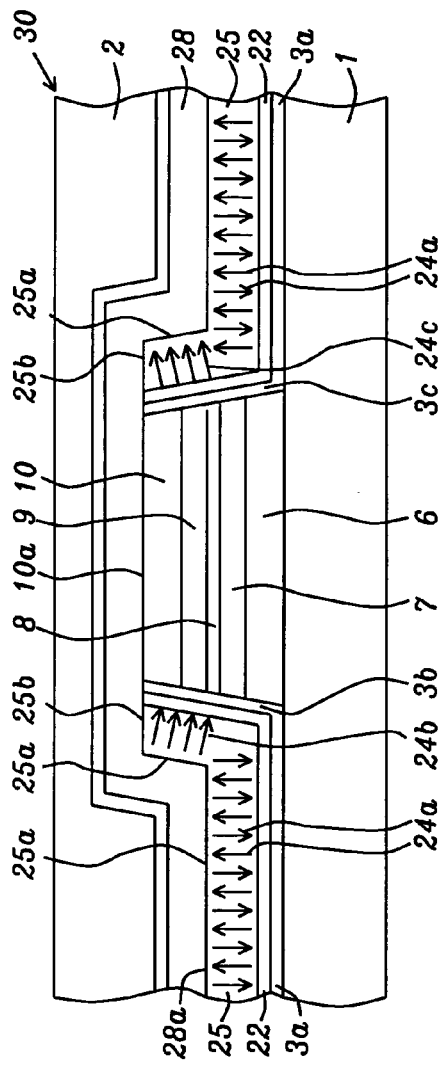
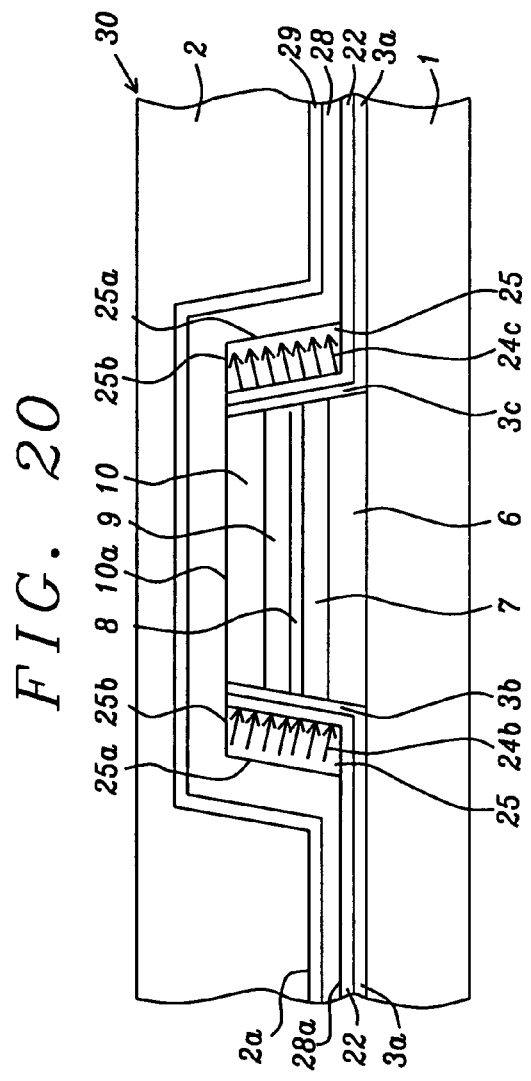

ENHANCED HARD BIAS IN THIN FILM MAGNETORESISTIVE SENSORS WITH PERPENDICULAR EASY AXIS GROWTH OF HARD BIAS AND STRONG SHIELD-HARD BIAS COUPLING

FIELD OF THE INVENTION

The invention relates to an improved hard bias (HB) structure having perpendicular easy axis growth on a seed layer and stabilization from shield-HB coupling which can increase the hard bias field strength and lower the hard bias field variation in thin film magneto-resistive (MR) sensors.

BACKGROUND OF THE INVENTION

In a magnetic recording device in which a read head is based on a spin valve magnetoresistance (SVMR) or a giant magnetoresistance (GMR) effect, there is a constant drive to increase recording density. One method of accomplishing this objective is to decrease the size of the sensor element in the read head that is suspended over a magnetic disk on an air bearing surface (ABS). The sensor is a critical component in which different magnetic states are detected by passing a sense current through the sensor and monitoring a resistance change. A popular GMR configuration includes two ferromagnetic layers which are separated by a non-magnetic conductive layer in the sensor stack. One of the ferromagnetic layers is a pinned layer wherein the magnetization direction is fixed by exchange coupling with an adjacent anti-ferromagnetic (AFM) pinning layer. The second ferromagnetic layer is a free layer wherein the magnetization vector can rotate in response to external magnetic fields. In the absence of an external magnetic field, the magnetization direction of the free layer is aligned perpendicular to that of the pinned layer by the influence of hard bias layers on opposite sides of the sensor stack. When an external magnetic field is applied by passing the sensor over a recording medium on the ABS, the free layer magnetic moment may rotate to a direction which is parallel to that of the pinned layer. Alternatively, in a tunneling magnetoresistive (TMR) sensor, the two ferromagnetic layers are separated by a thin non-magnetic dielectric layer.

A sense current is used to detect a resistance value which is lower when the magnetic moments of the free layer and pinned layer are in a parallel state. In a CPP configuration, a sense current is passed through the sensor in a direction perpendicular to the layers in the sensor stack. Alternatively, there is a current-in-plane (CIP) configuration where the sense current passes through the sensor in a direction parallel to the planes of the layers in the sensor stack.

Ultra-high density (over 100 Gb/in$^2$) recording requires a highly sensitive read head in which the cross-sectional area of the sensor is typically smaller than 0.1×0.1 microns at the ABS plane. Current recording head applications are typically based on an abutting junction configuration in which a hard bias layer is formed adjacent to each side of a free layer in a GMR spin valve structure. As the recording density further increases and track width decreases, the junction edge stability becomes more important so that edge demagnification in the free layer needs to be reduced. In other words, horizontal (longitudinal) biasing is necessary so that a single domain magnetization state in the free layer will be stable against all reasonable perturbations while the sensor maintains relatively high signal sensitivity.

In longitudinal biasing read head design, films of high coercivity material are abutted against the edges of the sensor and particularly against the sides of the free layer. By arranging for the flux flow in the free layer to be equal to the flux flow in the adjoining hard bias layer, the demagnetizing field at the junction edges of the aforementioned layers vanishes because of the absence of magnetic poles at the junction. As the critical dimensions for sensor elements become smaller with higher recording density requirements but sensor layer thickness decreases at a slower rate, the minimum longitudinal bias field necessary for free layer domain stabilization increases.

A high coercivity in the in-plane direction is needed in the hard bias layer to provide a stable longitudinal bias that maintains a single domain state in the free layer and thereby avoids undesirable Barkhausen noise. This condition is realized when there is a sufficient in-plane remnant magnetization ($M_r$) from the hard bias layer which may also be expressed as $M_r t$ since hard bias field is also dependent on the thickness (t) of the hard bias layer. $M_r t$ is the component that provides the longitudinal bias flux to the free layer and must be high enough to assure a single magnetic domain in the free layer but not so high as to prevent the magnetic field in the free layer from rotating under the influence of a reasonably sized external magnetic field. Moreover, a high squareness (S) hard bias material is desired. In other words, $S=M_r/M_S$ should approach 1 where $M_S$ represents the magnetic saturation value of the hard bias material.

Referring to FIG. 1, a generic TMR or CPP-GMR read head structure 40 is shown that is similar to read heads currently being employed in manufacturing or in development. Read heads of this type are described in the following references: R. Fontana and S. Parkin, "Magnetic tunnel junction device with longitudinal biasing", U.S. Pat. No. 5,729,410; S. Mao et al., "Commercial TMR heads for hard disk drives: characterization and extendibility at 300 Gbit/in$^2$", IEEE Trans. Magn., Vol. 42, No. 2, p. 97 (2006); and T. Kagami et al., "A Performance Study of Next Generation's TMR Heads Beyond 200 Gb/in$^2$", IEEE Trans. Magn., Vol. 42, No. 2, p 93 (2006). The read head 40 is comprised of a bottom shield 1 and a top shield 16 that also function as bottom and top electrical leads for conducting current through the sensor stack. Layers 6 through 10 represent the sensor stack that is formed on the bottom shield 1 and is patterned by a well known method to form nearly vertical or slightly sloping sidewalls such that layer 6 has a larger length along the x-axis than layer 10. Layer 6 is generally a multilayer structure that may have a seed layer, an anti-ferromagnetic (AFM) layer, and a pinned layer (not shown), being exchange coupled to the AFM layer, deposited sequentially on the bottom shield 1. A reference or second pinned layer 7 is on the layer 6 and may have a synthetic anti-ferromagnetic (SAF) composition like the first pinned layer. The spacer layer 8 is usually an insulator comprised of a metallic oxide for TMR heads, or a metallic layer or a layer with metallic nano-channels for CPP GMR heads. Above the spacer layer 8 is a free layer 9 and a layer 10 that may be a capping layer, for example.

An insulating layer 3 is formed along the sidewalls of the sensor stack and on the bottom shield 1 adjacent to the sensor stack and is typically a metallic oxide that prevents shorting between the top and bottom shields as well as the sensor stack. A seed layer 4 disposed on the insulating layer 3 is commonly used to promote the in-plane easy axis of the hard bias material during deposition of the hard bias layer 5 as mentioned in the following references: D. Larson et al. in U.S. Pat. No. 7,061,731; P. Chau et al. in Publication No. US 2005/0066514; H. Gill in Publication No. US 2006/0114622; M. Pinarbasi in Publication No. US 2006/0087772; and K. Zhang et al. in Publication No. US 2006/0132989. The seed layer 4 leads to the hard axis of the hard bias (HB) layer 5 being grown perpendicular to the seed layer plane. Above the HB layer 5 there is generally a capping layer 11 that has multiple purposes such as increasing the spacing between the hard bias layer 5 and top shield 16, increasing the HB field uniformity, and reducing HB internal stress after deposition.

In an ideal situation, the magnetization of the hard bias layer 5 is aligned longitudinally (along the x-axis) and parallel to the sensor film plane after the sensor is exposed to a strong magnetic field applied in the direction of the arrows 12. This process is called the hard bias initialization step. Ideally, the magnetic charges 13a, 13b, created by the HB magnetization on the side edges of the sensor stack will provide a longitudinal field in the free layer as a bias field. This field keeps free layer 9 magnetization longitudinal when no external field is applied. In the example shown in FIG. 1, the reference layer 7 has a fixed magnetization along the y-axis as a result of an annealing process and coupling with the first pinned layer and AFM layer in layer 6. When a magnetic field of sufficient strength is applied in the y direction from a recording medium by moving the read head 40 over a hard disk surface (not shown) oriented in the z direction, then the magnetization in the free layer 9 switches to the y directions. This change in magnetic state is sensed by a voltage change due to a drop or increase in the electrical resistance for an electrical current that is passed through the sensor. In a TMR or CPP spin valve, the sense current between the top shield 16 and bottom shield 1 is in a direction perpendicular to the planes of the sensor stack.

Unfortunately, the ideal case of forming magnetic charges adjacent to the sensor stack as depicted in FIG. 1 is not representative of conditions in an actual read head since the read head 40 has some intrinsic properties that tend to cause significant HB field degradation and large HB field variations. These problems are especially significant in narrow shield-shield read head applications where the distance between the top and bottom shields is reduced in order to achieve high areal density magnetic recording.

Referring to FIG. 2a, the growth pattern of the HB material in HB layer 5 is shown for the longitudinal HB scheme described in FIG. 1. Only the left portion of the sensor structure is shown in the drawing. Note that the insulating layer 3 has a section 3a that is formed on the bottom shield 1 and a section 3b along the side of the sensor stack. Since the seed layer 4 conforms to insulating layer 3 and promotes an in-plane easy axis orientation, the easy axis of the HB layer 5 formed on the seed layer above section 3a is parallel to the sensor film plane while the easy axis of the HB layer deposited on the seed layer on sloped section 3b will generally follow the slope direction. Arrows 14a and 14b illustrate the possible growth pattern of the HB easy axis above sections 3a and 3b, respectively. Area 15 where the two different easy axis orientations meet is where a high stress or amorphous phase of the HB layer 5 will likely occur.

After HB initialization, HB magnetization will fall back on to the easy axis directions shown in FIG. 2a since the HB material usually has a strong uniaxial anisotropy along the easy axis. Therefore, the region of the HB layer 5 adjacent to section 3b will contribute little to the bias field in the free layer 9 as its magnetization direction is mainly along the sensor edges and does not produce much magnetic charge on the stack edges, unlike the ideal case in FIG. 1. On the other hand, area 15 where two differently oriented magnetizations meet in the HB layer 5, will have body charges that can produce a magnetic field to the sensor free layer 9 as a biasing field. Thus, in reality, the hard bias field present in conventional TMR or CPP GMR read heads is theoretically not comprised primarily of surface charges along the sensor edge, but is from body charges in the HB layer 5. The farther away the body charges (not shown) are from the sensor edge, the less amount of biasing field that the charges can produce in the free layer 9, because the solid angle 50 from the charged areas relative to the free layer edges becomes smaller as distance between the body charges and free layer increases.

In FIG. 2b, the concept of solid angle is explained in more detail and the layers in read head 40 are removed to simplify the drawing. This cross-sectional view illustrates that a charged surface 51 in the HB layer can be projected 54 onto a spherical surface 52 having an area "s" and ultimately focused to a point 53 on the free layer that is located a distance r from the spherical surface. From a top-down view (not shown), the spherical surface would appear as a circle, and from a cross-sectional view, the projection of the charged surface 51 onto point 53 would appear as a cone shape. The solid angle 50 is determined by dividing s by $r^2$.

A reader shield-HB coupling effect can further degrade the HB strength according to the scenario depicted in FIG. 2a. In FIG. 3a, an example is shown where there are no magnetic shields above or below the sensor stack. Two circled regions 17a, 17b are schematics of body charge distribution in the HB layer 5. Exchange interaction between the HB grains is also included because HB grains in read heads are usually not well segregated by non-magnetic boundaries as they are in a magnetic recording medium. Therefore, the tilting of the magnetization away from the x-axis or sensor plane occurs farther away from the sensor edge and insulating layer section 3b. The magnetization direction in the HB layer 5 is represented by arrows 18. Region 17a represents a stronger body charge and region 17b has a weaker body charge. When top and bottom shields are added, especially when the top shield 16 (FIG. 3b) follows the HB layer 5 and sensor stack topography, the HB layer strength can be weakened by the shield-HB coupling of the HB and HB magnetization rotation.

FIG. 3b illustrates the effect of shield-HB coupling. The image of the HB in the top shield, for example, dashed arrows 19, has two effects. First the induced surface charge on the lower surface 16a of the top shield 16 facing the HB layer 5 is opposite to the HB surface charge or body charge that provides the hard bias field to the free layer 9 and thereby causes the effective bias field to the sensor stack to decrease. Secondly, the HB image (arrows 19) attracts HB magnetization 18 to rotate towards the direction perpendicular to the bottom surface 16a of the top shield to minimize Zeeman energy between the HB image and HB layer 5. Additionally, with the top shield 16 conforming to the HB layer 5 topography, the imaging effect is equally strong along the top surface of the HB layer which produces more canceling charges (not shown) on the bottom surface 16a and also enhances the rotational behavior of the magnetization direction 18. Additional rotation of the HB magnetization from shield-HB coupling will cause the body charges in the HB layer 5 to migrate further inside the HB layer and away from the sensor stack edge. Note that region 17a has weaker charges in FIG. 3b than in FIG. 3a and there is an additional region 17c having weak charges formed a greater distance from section 3b and the sensor structure. As a result, the effective solid angle of the HB body charge relative to the free layer 9 becomes smaller and the HB field decreases correspondingly. Note that region 17b has a smaller solid angle 50b than the solid angle 50a for region 17a because of a larger distance "r" from the free layer 9. Effective solid angle is related to charge density (body integration×solid angle of the area divided by the $M_S$ of the hard bias material.

The shield-HB coupling mechanism is more severe in narrow shield-shield spacing examples. For high density magnetic recording beyond 1 $Tb/in^2$, the areal density requires increasingly narrow down-track bit length and cross-track track width. To successfully read back narrower bit lengths, the read head's down track resolution must be improved which is usually achieved by narrowing the reader shield-shield spacing. In FIG. 4, an example of narrow shield-shield spacing is shown. To narrow the shield-shield spacing between bottom shield 1 and top shield 16, a very thin capping layer 11 and a thin HB layer 5 are generally employed. When a thin capping layer 11 is used, the distance between the HB layer 5 and bottom surface 16a is reduced thereby leading to enhanced imaging of the HB layer by the top shield 16 and a greater shield-HB coupling effect. In a scheme with a thinner HB layer 5, the HB cross section area decreases proportionally with the HB thickness. As a result, the body charge that contributes to the bias field is reduced. Therefore, a narrower shield-shield spacing in a conventional read head causes degradation of the HB field and a loss in device performance because of the combined effect of thinner capping and HB layers.

The shield-HB coupling induced HB field weakening can be mitigated by flat top shield 16 topography. However, flat topography normally requires chemical mechanical polishing (CMP) of the sensor stack. As sensor shield-shield spacing shrinks to several tens of nanometers in advanced technologies, it is both technically and economically difficult to control CMP of the sensor stack with high fabrication yield. For instance, non-uniformities in the CMP process can easily cause large thickness variations in the capping layer 10 from one sensor to the next. An alternative HB scheme is needed that avoids CMP and can provide a robust and stable biasing field to the free layer in the sensor stack even in narrow shield-shield spacing configurations.

During a search of the prior art, the following references were discovered. U.S. Patent Application 2006/0132989 teaches longitudinal in-plane biasing. U.S. Patent Application 2005/0237677 describes a Co based hard bias layer formed on an underlayer made of Ru, Ti, Zr, Hf, Zn, or an alloy thereof. In this CIP design, however, uncompensated back side charges will degrade the HB field generated by charges inside the HB layer.

U.S. Pat. No. 7,061,731 discloses an oblique deposition of a hard bias layer in a direction normal to the preferred direction of anisotropy. A seed layer is optional. U.S. Pat. No. 6,858,320 teaches that a seed layer may degrade the orientation of the underlayer so a non-magnetic intermediate layer is preferred. U.S. Patent Application 2006/0114622 describes a hard bias layer formed on a seed layer on either side of a sensor. An AP pinned structure on the hard bias layer reduces dependence on the seed layer and increases coercivity. U.S. Patent Application 2006/0087772 shows a hard bias layer formed on a CrMo seed layer. U.S. Pat. No. 7,072,156 discloses a decoupling layer between two hard bias layers that acts as a seed layer to cause grains to have easy magnetization parallel to the interface between the layers. U.S. Patent Application 2005/0066514 shows a hard bias seed layer made of Si and Cr or CrMb.

U.S. Pat. No. 6,185,081 describes a seed layer that promotes in-plane c-axis growth. U.S. Pat. No. 6,144,534 discloses a seed layer that disconnects the coherent crystal growth of the c-axis toward the perpendicular. U.S. Patent Publication 2005/0164039 teaches that the c-axis should be in-plane and not perpendicular.

SUMMARY OF THE INVENTION

One objective of the present invention is to provide a hard bias layer that achieves a high concentration of surface charges along the sidewalls of the sensor stack in order to maximize the biasing field to the free layer in the sensor stack.

A second objective of the present invention is to provide a hard bias (HB) layer for biasing a free layer in a magnetoresistive sensor that has high HB coercivity and stability with small HB field variations.

A third objective of the present invention is to provide a hard bias scheme that utilizes a shield-HB coupling effect to increase HB layer stability and HB field strength.

A fourth objective of the present invention is to provide a hard bias structure and a top shield that conforms to the HB layer and sensor stack topography to further enhance the shield-HB coupling.

A fifth objective of the present invention is to provide a hard bias layer and junction configuration that generates a strong bias field for narrow shield-shield spacing schemes in read heads for high density magnetic recording.

A further objective is to provide a method of forming a hard bias layer having an easy axis perpendicular growth that provides a robust, stable, and uniform hard bias field to longitudinally bias an adjacent free layer in a magnetoresistive sensor.

According to the present invention, these objectives are achieved by providing a bottom shield and a patterned sensor stack with opposite sides (sidewalls) formed thereon. An insulating layer is formed on the sidewalls of the sensor stack and on the bottom shield adjacent to the sensor stack. Above the insulating layer is a seed layer. A key feature is growth of the HB material on the seed layer such that the easy axis of the HB layer is oriented perpendicular to the seed layer. Following HB initialization, HB magnetization near the sensor will be along the easy axis and perpendicular to the nearby sidewall of the sensor stack, resulting in surface charges as close as possible to the free layer. Body charges in regions of the HB layer along horizontal sections of seed layer are not significant and only charges from grains along the sloped sensor stack edges are major contributors to the hard bias field. Surface charges near the top surface of the HB layer that could weaken the HB field are effectively counterbalanced by induced charges from the top shield because of strong shield-HB coupling. This HB stabilization scheme may be fully utilized and HB field variations can be minimized by various embodiments that involve different magnetoresistive (MR) junction shapes and modified HB layer structures.

In one embodiment, a stack formed by sequential deposition of an insulating layer, seed layer, and HB layer having an easy axis oriented perpendicular to the seed layer is disposed on the bottom shield and along the sidewalls on opposite sides of the sensor stack. Thus, the HB layer is comprised of a flat region above the bottom shield and two sloped regions near the sidewalls on opposite sides of the sensor stack. Above the HB layer and sensor stack is a capping layer that essentially conforms to the topography of the HB layer and top surface of the sensor stack. The top shield is formed on the capping layer and also follows the topography of the HB layer. After HB initialization, the opposite polarity surface charges on opposing sides of the sensor stack create a bias field within the sensor. The top shield strongly couples with the HB layer to substantially compensate for charges at the top of the HB layer and thereby maximize the effect of the bias field generated by the surface charges on opposite sides of the sensor stack.

In a second embodiment, the flat region of the HB layer is removed to leave a HB region on the seed layer along either sidewall of the sensor stack. This configuration affords less HB field variation and reduces side reading at high track density because of additional side shielding by the top shield.

Two additional embodiments involve extending the sensor stack slope into the bottom shield while maintaining the same hard bias configurations described in the first two embodiments. These alternatives increase the volume of the sloped HB region which in turn increases the number of surface charges along the sensor stack while improving the side shielding from the top shield.

In a second series of embodiments, the capping layer between the HB layer and top shield is removed so that the coupling between the top shield and HB layer is through direct exchange coupling of their respective magnetizations and not from a magneto-static field effect through a capping layer.

A third set of embodiments is similar to the first series of four embodiments except that a soft magnetic layer and a non-magnetic spacer layer are sequentially formed on the capping layer such that the soft magnetic layer may replace an equal volume of the top shield. The soft magnetic layer has a similar magnetic property as the top shield and is exchange decoupled from the top shield by the spacer layer.

In the fourth series of embodiments, the capping layer in the third series of embodiments is removed such that the soft magnetic layer is formed on the hard bias layer and top surface of the sensor stack. In this case, the soft magnetic layer is direct exchanged coupled with the HB layer to compensate for charges on the HB surface.

In one aspect, the seed layer has an amorphous top surface that promotes a natural growth of the hard bias layer's perpendicular easy axis as determined by the hard bias layer's own crystalline properties. Optionally, the top surface of the seed layer may have a crystalline texture that promotes an epitaxy growth of the hard bias layer's perpendicular easy axis through lattice matching.

BRIEF DESCRIPTION OF THE DRAWINGS

FIG. 1 is a cross-sectional view showing a magnetic read head having a free layer in a sensor stack that is stabilized by a conventional longitudinal hard bias scheme.

FIG. 2a is an enlarged view of the left half of FIG. 1 that illustrates the hard bias (HB) easy axis orientation which is promoted by the seed layer in a conventional read head.

FIG. 2b is a cross-sectional view of the solid angle depicted in FIG. 2a that shows the projection of a charged surface onto a spherical surface.

FIG. 3a is a cross-sectional view of the read head in FIG. 1 that shows body charge distribution in the HB layer and FIG. 3b depicts how the top shield-HB layer coupling tilts the magnetization away from the sensor stack edge to degrade the HB field strength.

FIG. 4 is a cross-sectional view of a conventional read head with narrow shield-shield spacing and a thin HB layer that causes further degradation of the HB field compared with FIG. 3b.

FIG. 5 is a cross-sectional view of a read head in which the HB layer with grains having an easy axis grown perpendicular to the seed layer according to the present invention.

FIGS. 8 and 9 are cross sectional views of the entire sensor stack in a read head and show magnetization directions in the HB layer according to two embodiments of the present invention where a capping layer is formed between the HB layer and top shield.

FIG. 14 is an embodiment of the present invention wherein the capping layer between the HB layer and top shield in FIG. 10 is removed.

FIG. 15 is an embodiment of the present invention wherein the capping layer between the HB layer and top shield in FIG. 11 is removed.

FIG. 18 is an embodiment wherein a soft magnetic layer and an overlying non-magnetic spacer are inserted between the capping layer and top shield in FIG. 10.

FIG. 19 is an embodiment wherein a soft magnetic layer and an overlying non-magnetic spacer are inserted between the capping layer and top shield in FIG. 11.

FIG. 20 is an embodiment of the present invention wherein the capping layer in FIG. 16 is removed to give direct contact between the HB layer and soft magnetic layer.

FIG. 21 is an embodiment of the present invention wherein the capping layer in FIG. 17 is removed to give direct contact between the HB layer and soft magnetic layer.

DETAILED DESCRIPTION OF THE INVENTION

Figure 6A:
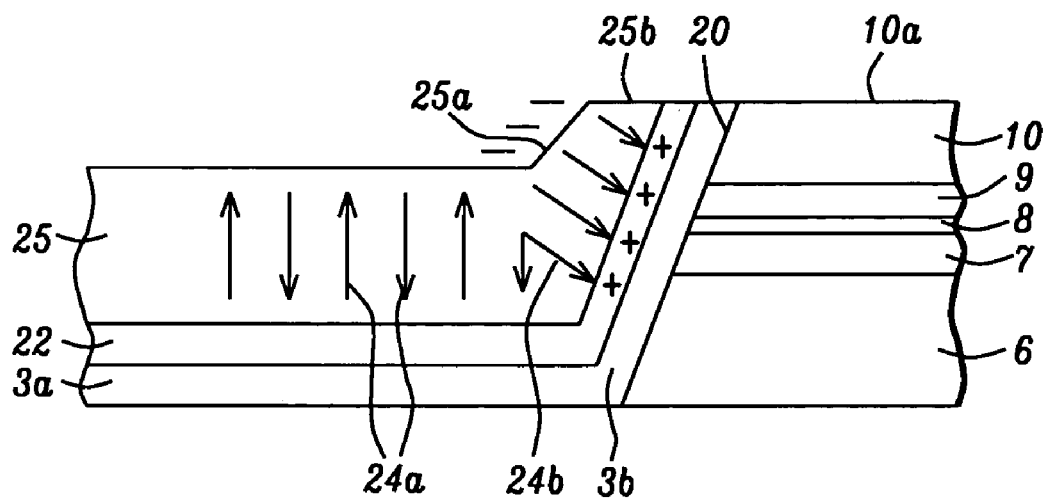
FIG. 6a is a cross-sectional view of the structure in FIG. 5 with the shields removed to show magnetization direction and surface charges in the HB layer and FIG. 6b shows how shield-HB coupling balances the HB top surface charges in FIG. 6a to enhance the HB field from surface charges formed along the sensor stack edge.

The present invention is an improved hard bias structure in a magnetic read head and a method for forming the same that improves the HB field strength, uniformity, and stability for longitudinal biasing of a free layer in an adjacent sensor stack and is especially appropriate for narrow shield-shield spacing configurations where conventional HB structures lack HB field strength and control. Although the exemplary embodiments depict a top spin valve in the sensor device, those skilled in the art will appreciate that the present invention may also apply to bottom spin valves or multilayer spin valves in sensor designs based on a GMR or TMR effect. Furthermore, the present invention encompasses a sense current path that may be either current perpendicular to plane (CPP) or current in plane (CIP). The drawings are provided by way of example and are not intended to limit the scope of the invention. The present invention is also a method of forming a HB structure in a read head in which the HB growth has an easy axis perpendicular to the underlying seed layer.

The concept of perpendicular medium development has already been demonstrated in examples involving a magnetic recording medium where the easy axis of the hard magnetic material is grown perpendicular to an underlying layer with an easy axis tilting angle distribution of a few degrees as described in the following references: M. Zheng et al, "Seed-layer and Preheating Effects on Crystallography and Recording Performance of CoCrPtB Perpendicular Media", IEEE Trans. Magn., Vol. 38, p. 1979 (2002); R. Mukai et al, "Microstructure Improvement of Thin Ru Underlayer for CoCrPt—$SiO_2$ Granular Perpendicular Media", IEEE Trans. Magn., Vol. 41, p. 3169 (2005); and D. Vokoun et al, "Effects of Tb/Pt/Ru underlayer on microstructure and magnetic properties of CoPtCr—$SiO_2$ perpendicular media", J. App. Phys., Vol 99, p. 08E703, April, 2006. Although Publication No. US 2005/0237677 mentions a perpendicular HB growth, no shield-HB coupling is included and the teaching is mainly for a CIP head.

Referring to FIG. 5, a portion of a sensor stack in a read head structure 30 is shown as viewed from an air bearing surface (ABS) plane. A bottom shield 1 made of permalloy, for example, is formed on a substrate (not shown) that is typically ceramic and a patterned sensor stack is formed on the bottom shield by a well known method. According to the exemplary embodiment of the present invention, the bottom layer 6 in the sensor stack may be comprised of a composite such as a seed layer and an overlying AFM layer. Above the bottom layer 6 is sequentially formed a reference layer 7, a non-magnetic spacer or tunnel barrier 8, a free layer 9, and a capping layer 10. The compositions of the layers within the sensor stack are not described because the present invention encompasses all sensor stacks and materials used to fabricate layers therein. The patterned sensor stack has a top surface 10a and a sidewall 20 along one side. A second sidewall 21 along the opposite side is illustrated in FIG. 8 and in subsequent drawings.

The insulating layer 3 was described previously and has sections 3a and 3b formed on the bottom shield 1 and sidewalls 20, respectively. The top shield 2 above the capping layer 11 may be comprised of the same material in top shield 16 described previously but is generally more conformal to the sidewalls of the sensor stack. There is a seed layer 22 with a thickness between about 50 and 200 Angstroms disposed on the insulating layer 3. The seed layer 22 may be comprised of Ru, Ta, Ti, TiW, TiCr, Cr, CrV, CrMo, CrW, and Al or any multilayered structure of the aforementioned compositions but is not limited to those examples. A key feature is that the seed layer 22 promotes a hard bias easy axis growth perpendicular to the seed layer to give a hard bias (HB) layer 25. This growth may be accomplished by two different mechanisms. In one aspect, the seed layer 22 is substantially amorphous, especially at its top surface (not shown) where the HB layer contacts the seed layer. The amorphous phase at the top surface promotes a natural growth of the HB layer's perpendicular easy axis (c-axis) determined by the crystalline properties of the HB layer 26. Alternatively, the top surface of the seed layer 22 may be crystalline in order to promote an epitaxy growth of the HB layer's perpendicular easy axis through lattice matching. The crystalline top surface of the seed layer may derive its texture from a natural crystalline growth on an amorphous layer or by an epitaxy growth on a crystalline film. In one aspect, both the top surface of the seed layer 22 and hard bias layer 25 may have a body centered cubic (bcc) lattice.

The HB layer 25 preferably has a thickness in the range of about 100 to 300 Angstroms and may be comprised of CoCrPt or CoCrPtX where X may be B, O or other elements that can assist a perpendicular growth of the HB easy axis. Optionally, the HB layer may be made of TbFeCo and is preferably formed on an Al seed layer 22. Only certain combinations of seed layer and HB layer will result in perpendicular easy axis growth such as the TbFeCo/Al combination or a CoCrPt HB layer on a Ru or TiW seed layer, for example. Another example is a $[Co/Pt/Co]_n$ or $[Co/Pd/CO]_n$ HB layer grown on a Pt or Pd seed layer where n is an integer$\geq 1$ and can be adjusted according to the moment requirement. The aforementioned HB layer/seed layer configurations can be grown by either physical vapor deposition (PVD) or ion beam deposition (IBD) methods.

The inventor has discovered that temperature and other deposition conditions are critical for easy axis HB growth perpendicular to the seed layer 22. One example where a CoCrPt HB layer 25 is deposited on a $Ti_{90}W_{10}$ or Ti seed layer 22 involves growing both layers in a IBD system with a Ti or $Ti_{90}W_{10}$ layer having a thickness of about 70 Angstroms or greater. Furthermore, in order to achieve a uniformly thick HB layer 25 on a seed layer 22 with topography as depicted in the preferred embodiments (FIGS. 8-23), it may be necessary to perform the seed layer deposition and HB deposition in more than one step. For example, a first step may involve a high deposition angle while a second step employs a low deposition angle. The deposition processes of the insulating layer, seed layer, and HB layer are generally performed with a photoresist mask (not shown) on the top of the patterned sensor stack. To minimize the overspray, a shaper may be used in IBD systems. Typically, the photoresist mask is removed after the HB layer 25 is formed. In some embodiments, portions of the HB layer 25 are removed by an etch process such as reactive ion etch (RIE) so that only hard bias regions along the sidewalls 20, 21 remain. To smooth the topography so that the HB layer 25 and seed layer 22 are about coplanar with the top surface 10a of the sensor stack, a mild CMP process may be employed. As mentioned previously, a HB layer 25 with perpendicular anisotropy may also be achieved by multilayer ferromagnetic/non-magnetic super-lattice structures such as $[Co/Pt/Co]_n$ or $[Co/Pd/Co]_n$.

Returning to FIG. 5, arrows 40a represent easy axis of HB grains formed on the seed layer 22 above insulating layer 3a and arrows 40b represent the easy axis of HB grains formed on the seed layer above insulating layer 3b. With the easy axes 40a, 40b oriented perpendicular to the underlying seed layer 22, initialization of the HB layer 25 can be achieved similar to examples where the HB grains are grown parallel to the underlying seed layer. For instance, a strong in-plane longitudinal field that overcomes the anisotropy field of the HB material may be applied along the x-axis direction (left to right) and aligns the HB magnetization in the same direction as the applied field. Once the field is withdrawn, the magnetizations of the HB grains relax to the uniaxial easy axis direction that has a smaller angle to the longitudinal direction. HB initialization preferably occurs after a top shield 2 has been formed. For HB grains grown along the sidewall 20, the magnetization will be in the direction along the easy axis direction but pointing downwards (toward the sidewall 20). Therefore, the charges (not shown) from the HB layer 25 are mainly surface charges from these edge grains indicated by the circled area 23. This charge placement is actually the best situation for generating a strong HB field in the sensor stack and free layer 9 because the charges are at the closest position to the sensor stack (sidewall 20) and the solid angle (not shown) from the charges is maximized.

For HB grains grown above insulating layer 3a, their easy axis is perpendicular to the top surface 1a of the bottom shield 1 as indicated by arrows 40a and the orientation of the magnetization is theoretically random after HB initialization. Charges will be formed near the interface of HB layer 25 with seed layer 22 and capping layer 11 in regions above insulating layer 3a. Random magnetization is not a concern in these regions, however, since the solid angles formed by grains therein relative to the free layer 9 are much smaller than those grown above insulating layer 3b near sidewall 20. Therefore, the charges in the HB layer 25 above insulating layer 3a will be much smaller than the surface charges in area 23. A second consideration regarding random magnetization is that if the sensor stack and particularly the free layer 9 is positioned near the center plane (not shown) of the HB layer 25, the field from the net charge, if any, on the top and bottom surfaces of the HB layer above insulating layer 3a will cancel each other as they are exactly the opposite sign and of the same magnitude. Thirdly, with the top shield 2 present, the oppositely oriented magnetizations in the HB layer 25 above insulating layer 3a can easily form flux closure through the top shield-HB coupling and do not act on the free layer 9. As a result, only the charges from the HB grains above insulating layer 3b along sidewall 20 are major contributors to the HB field. It should be understood that the HB layer 25 on the opposite side of the sensor stack has a magnetization along sidewall 21 (FIG. 8) that is equal to the magnetization at sidewall 20 but pointing in a direction perpendicular to sidewall 21.

It is reasonable to think that the HB regions where the two different easy axis growth patterns meet will be an area where an amorphous phase may arise and cause variations in the HB field. However, this hard bias scheme does not depend on body charges to generate an HB field in the free layer 9. Moreover, the HB layer 25 thickness can be greatly reduced to minimize the effect of the amorphous phase in a region where arrows 40a and 40b intersect.

Unlike conventional hard bias schemes where top shield-HB coupling degrades the hard bias field, the present invention takes advantage of top shield-HB coupling to counterbalance charges at the top surface of HB layer 25 that arise from HB edge grains and thereby increase the hard bias field. Referring to FIG. 6a, grain magnetization orientation 24a and 24b after HB initialization is shown for a hard bias scheme without top and bottom shields. Note that the magnetization in area 23 (FIG. 5) produces surface charges near the interface of HB layer 25 and seed layer 22 above sidewall 20 in FIG. 6a that are of opposite sign to the charges at the top surface 25a of the HB layer above insulating layer 3b. Although magnetization 24a has a random direction, magnetization 24b is oriented toward the sensor sidewall 20 and gives rise to positive surface charges near sidewall 20 and negative charges on HB top surface 25a above insulating layer 3b. According to one embodiment of the present invention, a portion of the top surface 25b is coplanar with the sensor stack top surface 10a and an end of insulating layer 3b.

Figure 6B:
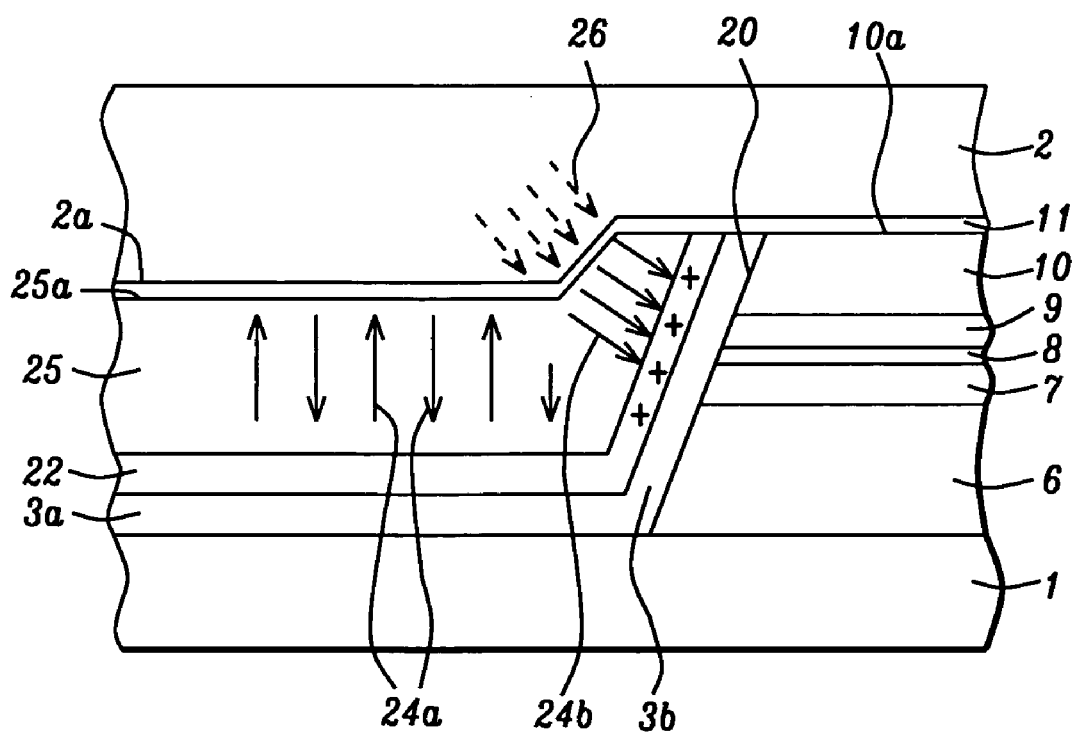

Referring to FIG. 6b, the example in FIG. 6a is modified by adding a bottom shield 1, a capping layer 11 on the HB layer 25 and top surface 10a, and a top shield 2 on capping layer 11. Since the top shield 2 is very close to the HB top surface 25a, the negative charges at the top surface 25a can be effectively counterbalanced by induced charges (not shown) from the top shield. As understood by those skilled in the art, this effect is attributed to the physical principle that magnetic flux must be continuous across an interface such as that between top surface 25a and top shield 2. It is believed that the HB magnetization 24b rotates slightly to a direction perpendicular to the HB top surface 25a above insulating layer 3b in order to minimize Zeeman energy between the HB magnetization 24b and the so called HB image 26 in the top shield 2.

Figure 7A:
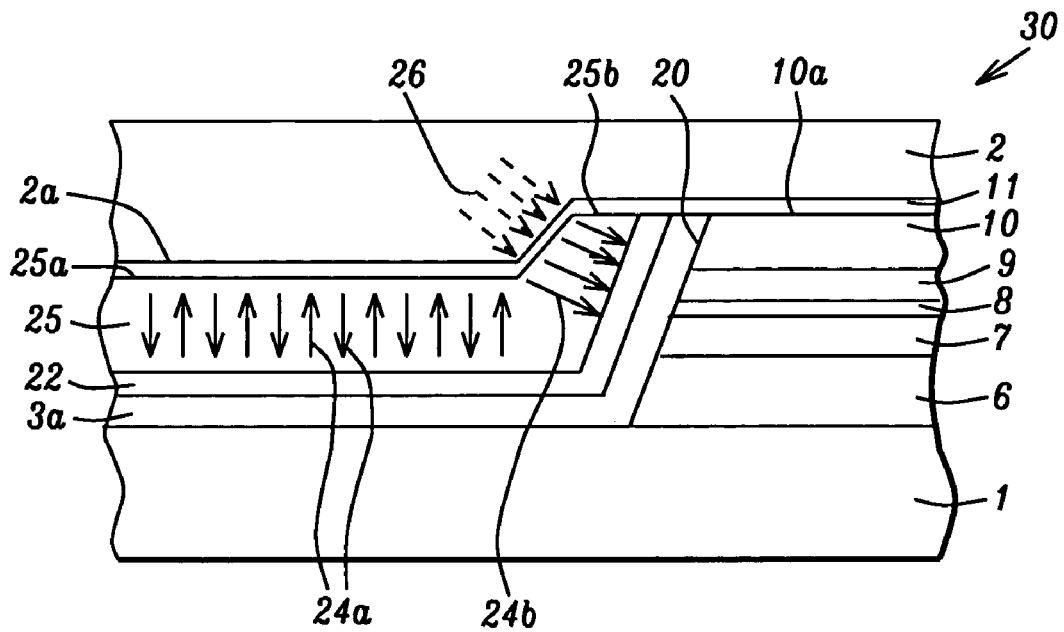
FIGS. 7a-7b are cross sectional views of one side of a sensor stack in a read head showing two different HB layer structures and junction shapes according to the present invention.

Referring to FIG. 7a, a further modification of the hard bias structure from FIG. 6b is shown. To fully utilize the shield-HB coupling assisted HB stabilization that was mentioned previously, and to minimize HB field variation related to the amorphous phase at the intersection of two easy axis growth directions, the HB layer 25 thickness is kept relatively uniform above seed layer 22. Because the HB film thickness is uniform above the sidewall 20, top shield 2 will conform to HB layer 25 topography and bottom surface 2a will parallel the sidewall 20 slope in a region above insulating layer 3b. With a strong shield-HB coupling, the HB magnetization 24b is more stiffly pinned in a direction essentially perpendicular to sidewall 20 by the coupling force than in FIG. 6b. The thickness of the HB layer 25 above insulating layer 3a is also thinner than in FIG. 6b. As a result, the volume of the possible HB amorphous phase is reduced in the region where magnetization 24a intersects magnetization 24b and thereby has a smaller effect on variation of the HB field. Capping layer 11 is preferably thin, on the order of 5 to 30 Angstroms to promote strong top shield-HB coupling that can effectively counterbalance the negative charge on the HB top surface 25a and produce a stiffly pinned magnetization 24b. Although the drawing depicts only the HB layer 25 on one side of the sensor, the structure of the HB layer on the opposite side is structurally the same as shown in FIG. 8. Flux or magnetization 24b and 24c on opposite sides of the sensor stack is nearly entirely conducted by the top shield 2 and forms flux closure (not shown) through the soft material of the top shield at a relatively large distance away from the junction sites where magnetizations 24b, 24c produce surface charges near the sidewalls 20 and 21, respectively.

Figure 7B:
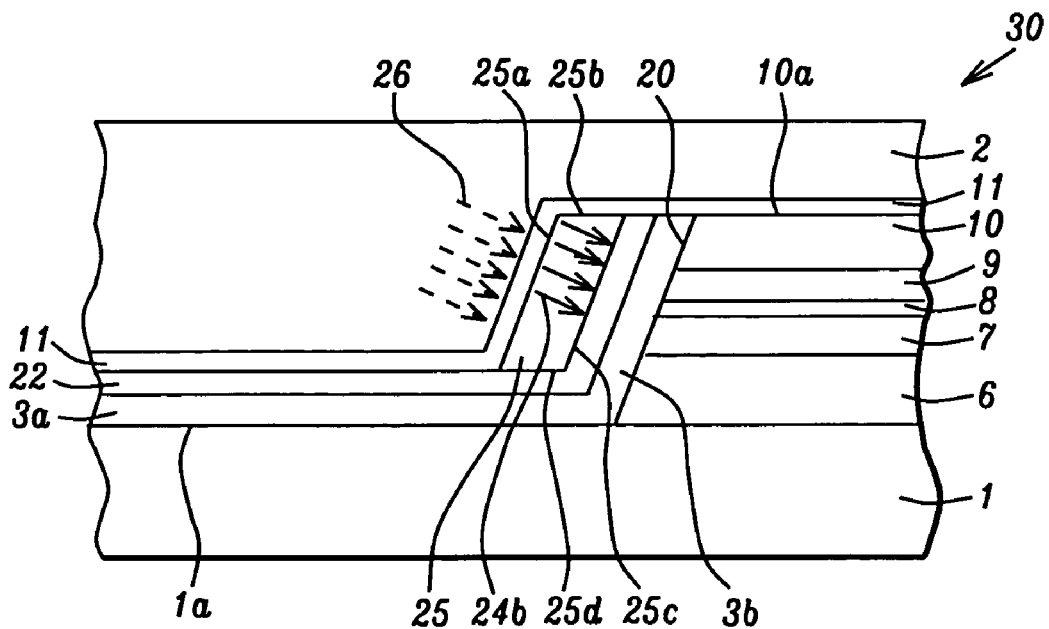

Referring to FIG. 7b, an additional modification of the HB structure shown in FIG. 7a is illustrated. The portion of HB layer 25 above insulating layer 3a has been removed to leave a portion of HB layer above insulating layer 3b that has a magnetization 24b. The modified HB layer 25 has a top surface 25a that is essentially parallel to sidewall 20, a bottom surface 25c on seed layer 22 above section 3b that is parallel to top surface 25a, one side 25b that is coplanar with top surface 10a of the sensor stack, and a second side 25d on seed layer 22 above insulating layer 3a that is parallel to the top surface 1a of the bottom shield 1. Removal of the HB portion having random magnetization 24a is believed to have two effects. First, less HB field variation is expected because the volume of the possible amorphous phase mentioned earlier is further reduced and the exchange interaction between magnetizations 24a is eliminated. Secondly, the top shield 2 now covers a greater portion of the sensor stack above sidewall 20 thereby decreasing side reading at high track density as appreciated by those skilled in the art.

Various embodiments of the present invention that take advantage of the robust HB field at the sensor sidewall 20 produced by magnetization 24b in FIGS. 7a-7b will now be described. In the preferred embodiments, the top shield 2 is shown to be conformal to the HB layer surfaces 25a, 25b, and the top surface 25a above insulating layers 3b, 3c is drawn parallel to the nearest sidewall 20 or 21. However, the actual HB layer 25 shape and top shield topography may vary and still retain the full advantages of the hard bias field generated in the exemplary embodiments. In all embodiments, the key feature is the perpendicular growth of the hard bias easy axis as described previously. Further, insulating layer 3 and seed layer 22 are shown as separate layers but may be a single layer in cases where an insulating layer is employed that also promotes easy axis perpendicular growth. All layers in the read head 30 may be a single layer or composite layer having two or more layers as appreciated by those skilled in the art.

Referring to FIG. 8, an embodiment is shown of a read head 30 that has a sensor stack with layers 6-10 and sidewalls 20, 21 as described previously. HB layer 25 has a shape as described in FIG. 7a and a magnetization 24b along sidewall 20 and a magnetization 24c along sidewall 21. Capping layer 11 is preferably thin as stated earlier with respect to FIGS. 7a-7b. HB magnetizations 24a, 24b (24c) are generated as previously described by HB initialization. In this case, the applied field during HB initialization is applied in the (+) x-axis direction. As a result, the HB magnetization 24b is essentially perpendicular to and pointing towards sidewall 20 and HB magnetization 24c is essentially perpendicular to and pointing away from sidewall 21. The HB images 26, 27 in top shield 2 stiffly pin the HB magnetizations 24b, 24c in their respective directions. Additionally, the topography of the top shield 2 follows the shape of the HB surfaces 25b and 25a above the insulating layer 3b in order to optimize the top shield-HB coupling that compensates for charges at the surface 25a thereby stabilizing the HB field generated by HB magnetizations 24b, 24c. Note that the random magnetization 24a has little effect on the HB field for reasons stated earlier. This embodiment offers an advantage over conventional HB designs when top shield-bottom shield spacing is reduced in order to achieve high density recording because a strong HB field is maintained at the free layer 9 due to strong shield-HB coupling in the portion of the HB layer having magnetizations 24b, 24c.

Referring to FIG. 9, a second embodiment is shown that is similar to the HB scheme in FIG. 8 except the portion of the HB region 25 above insulating layer 3a is removed as described previously with respect to FIG. 7b. In other words, the HB regions having magnetizations 24a are removed on both sides of the sensor stack by an etch process, for example, before overlying layers are deposited. This embodiment is believed to have an advantage over the HB scheme in FIG. 8 since there is less HB field variation due to a decrease in the volume of the possible amorphous phase in the HB layer at the intersection of magnetizations 24a and 24b and from an elimination of exchange interactions between HB grains having vertically oriented magnetizations 24a.

Figure 10:
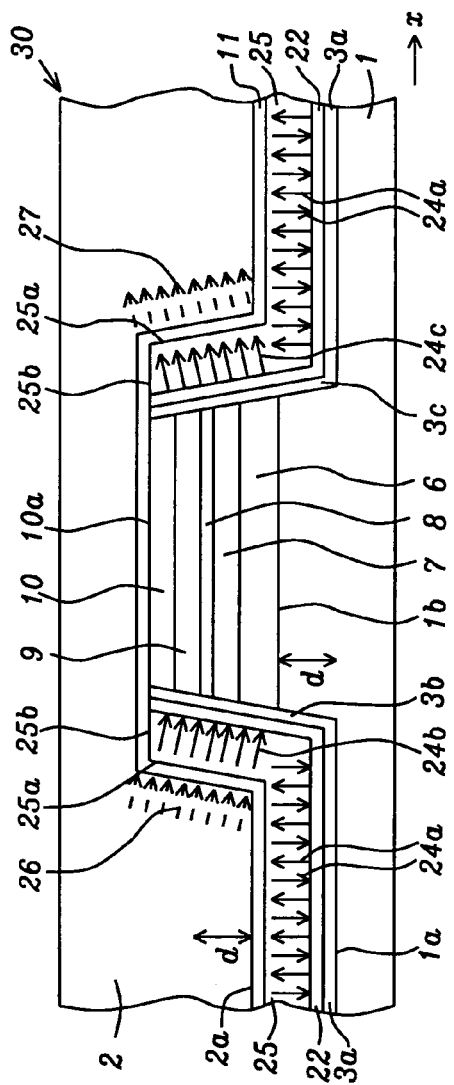
FIG. 10 is an embodiment of the present invention wherein the sidewalls of the sensor stack in FIG. 8 are extended into the bottom shield.

In a third embodiment represented by FIG. 10, the hard bias scheme is the same as described with respect to FIG. 8 except that the slopes of the sensor stack (sidewalls 20, 21) are extended a certain distance into the bottom shield 1. In other words, the top surface 1a of bottom shield 1 that is below insulating section 3a is now a distance d below the top surface 1b that contacts layer 6 in the sensor stack. In other words, the section of bottom shield 1 below the sensor stack has a greater thickness than adjacent sections of bottom shield. Sidewalls 20 and 21 may be extended into bottom shield 1 during the same etch sequence that patterns the sensor stack (layers 6-10) and before insulating layer 3 is deposited as appreciated by those skilled in the art. Extension of the sidewalls 20, 21 into bottom shield 1 results in a larger region of HB layer 25 with magnetization 24b, 24c near sidewalls 20, 21, respectively, compared with the first embodiment which increases the HB field for biasing free layer 9. An additional advantage over the first embodiment is that the bottom surface 2a of the top shield 2 is lowered by a distance d with respect to the sensor stack and offers additional protection against side reading at high track density.

Figure 11:
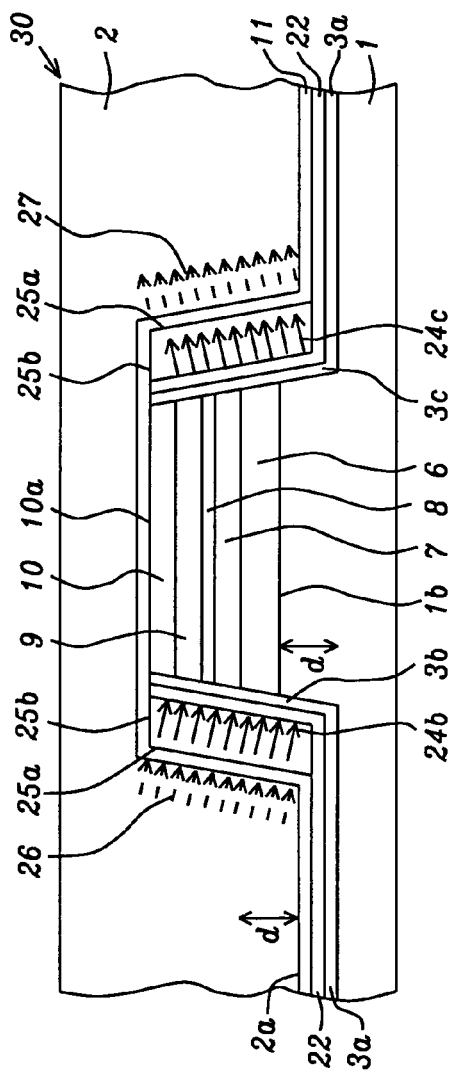
FIG. 11 is an embodiment of the present invention wherein the sidewalls of the sensor stack in FIG. 9 are extended into the bottom shield.

Referring to FIG. 11, a fourth embodiment is depicted that is the same as the second embodiment except the sidewalls 20, 21 have been extended into the bottom shield 1 as described earlier with respect to FIG. 10. The same advantages mentioned above regarding larger HB field for biasing the free layer 9 and greater protection against side reading apply here when comparing the fourth embodiment to the second embodiment because of etching a distance d into the bottom shield 1. In this case, even greater side reading protection is offered than in the third embodiment because the bottom surface 2a of the top shield 2 is lowered with respect to its position in FIG. 10 by a distance equivalent to the thickness of HB layer 25.

A second series of four embodiments represented by FIGS. 12-15 are related to the first series of four embodiments (FIGS. 8-11) since the various shapes and positions of the HB layer 25 remain the same as in the first series of embodiments. However, the capping layer 11 has been removed in FIGS. 12-15 so that the top shield 2 and HB layer 25 are in direct contact. HB images 26, 27 are present in top shield 2 but are not shown in order to simplify the drawings. The top shield 2 in FIGS. 12-15 follows the topography of the HB layer 25 such that the bottom surface 2a contacts the top surfaces 25a, 25b of the HB layer. Therefore, the top shield-HB coupling no longer occurs through a magneto-static field but through direct exchange coupling of the top shield magnetization (not shown) with the HB magnetizations 24b, 24c. The magnetizations 24b, 24c are oriented perpendicular to the sidewalls 20, 21, respectively, as in previous embodiments. Direct exchange coupling in the second series of embodiments is believed to afford a greater HB field to bias the free layer 9 than magneto-static field coupling in the first series of four embodiments.

Figure 12:
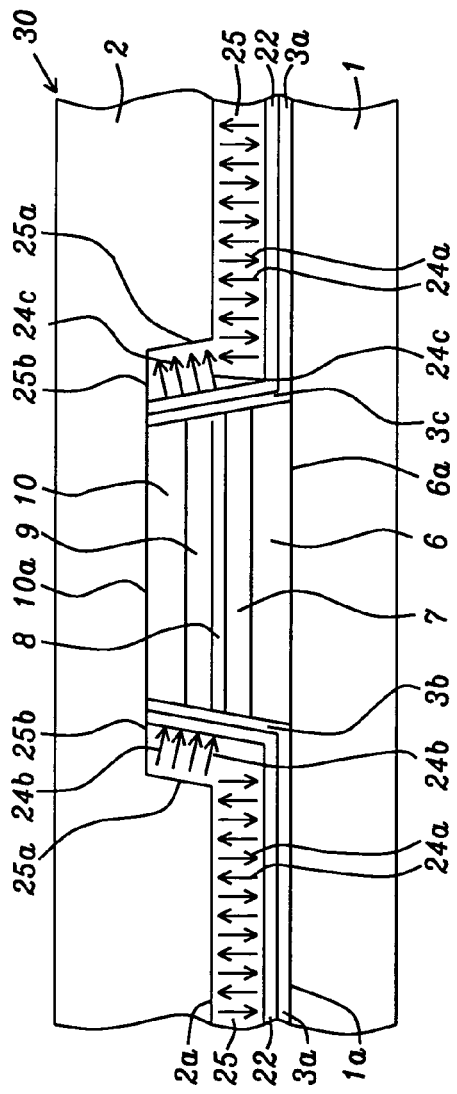
FIG. 12 is an embodiment of the present invention wherein the capping layer between the HB layer and top shield in FIG. 8 is removed to provide direct contact between the HB layer and top shield.

FIG. 12 represents a hard bias scheme where the HB layer has essentially equivalent thickness over insulating layer sections 3a, 3b while the HB surface 25b is coplanar with top surface 10a of the sensor stack, and the bottom shield 1 has a uniform thickness and a top surface 1a which is coplanar with the bottom surface 6a of layer 6 in the sensor stack.

Figure 13:
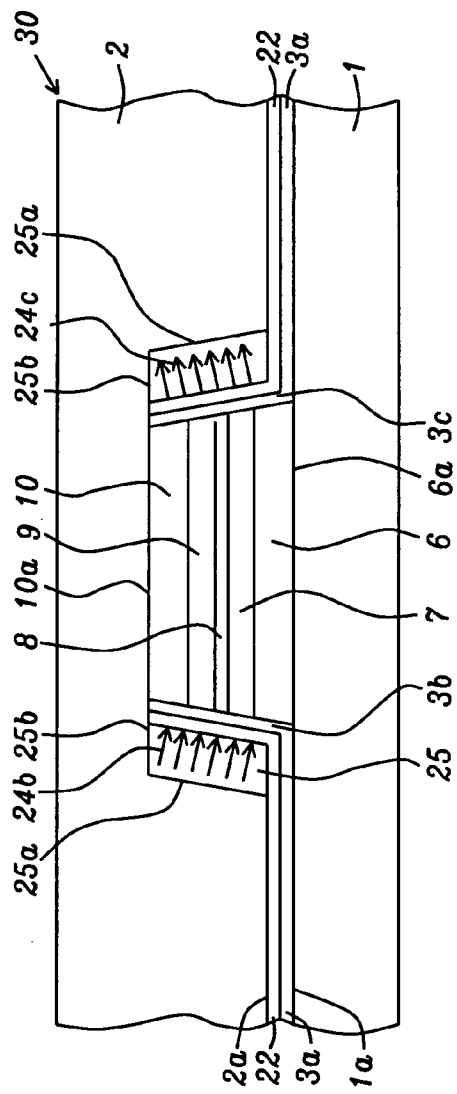
FIG. 13 is an embodiment wherein the capping layer between the HB layer and top shield in FIG. 9 is removed to provide direct HB layer—top shield contact.

Referring to FIG. 13, the hard bias structure is the same as in FIG. 12 except a portion of the HB layer 25 that has random magnetizations 24a above the insulating layer section 3a has been removed. The advantages of the HB structure in FIG. 13 relative to FIG. 12 are the same as those mentioned with regard to a comparison of the second embodiment to the first embodiment (FIGS. 8-9).

Referring to FIG. 14, the hard bias structure is the same structure as in FIG. 12 except that the sidewalls 20, 21 are extended a certain distance into the bottom shield 1. Thus, the top surface 1a of bottom shield 1 that is below insulating layer 3a is now a distance d below the top surface 1b that contacts layer 6 in the sensor stack. Extension of the sidewalls 20, 21 into bottom shield 1 results in a larger region of HB layer 25 with magnetization 24b, 24c near sidewalls 20, 21, respectively, compared with the embodiment in FIG. 12 and thereby increases the HB field for biasing free layer 9. Additionally, the bottom surface 2a of the top shield 2 is lowered by a distance d with respect to sidewalls 20, 21 and relative to its position in FIG. 12 which offers additional protection against side reading at high track density.

The hard bias structure in FIG. 15 is the same as in FIG. 13 except that the sidewalls 20, 21 are extended into the bottom shield 1. The portion of HB layer 25 having magnetization 24b, 24c has a greater volume than in FIG. 13 which results in a stronger HB field for biasing the free layer 9. Moreover, the bottom surface 2a of the top shield 2 is now lower by a distance d with respect to sidewalls 20, 21 and its position in FIG. 13 to provide additional protection against side reading.

A third series of four embodiments represented by FIGS. 16-19 are related to the first series of four embodiments (FIGS. 8-11) in that the various shapes and positions of the HB layer 25 remain the same as in the first series of embodiments. However, a soft magnetic layer 28 and an overlying non-magnetic spacer layer 29 that conform to the topography of capping layer 11 have been inserted between the capping layer and top shield 2 in FIGS. 16-19. Moreover, the HB images 26, 27 in FIGS. 8-11 are not shown here but are located in the soft magnetic layer 28 adjacent to the sloped sides 25a of HB layer 25. The soft magnetic layer 28 may be made of any soft magnetic material such as $Ni_{20}Fe_{80}$, CoFe, CoFeNb, CoFeZr, or CoFeB that has similar magnetic properties to the top shield 2 and in one aspect replaces an equivalent thickness of about 1000 to 5000 Angstroms of the top shield. Note that the bottom surface 2a of the top shield still follows the topography of the HB layer 25 and remains parallel to the HB surfaces 25a, 25b. The non-magnetic spacer 29 may be made of a metallic oxide such as aluminum oxide or titanium oxide and preferably has a thickness of about 50 to 200 Angstroms. Non-magnetic spacer 29 breaks the exchange interaction between top shield 2 and soft magnetic layer 28. As a result, soft magnetic layer-HB coupling replaces top shield-HB coupling and occurs through a magneto-static field to pin the HB magnetizations 24b, 24c in a direction perpendicular to the sidewalls 20, 21, respectively.

Figure 16:
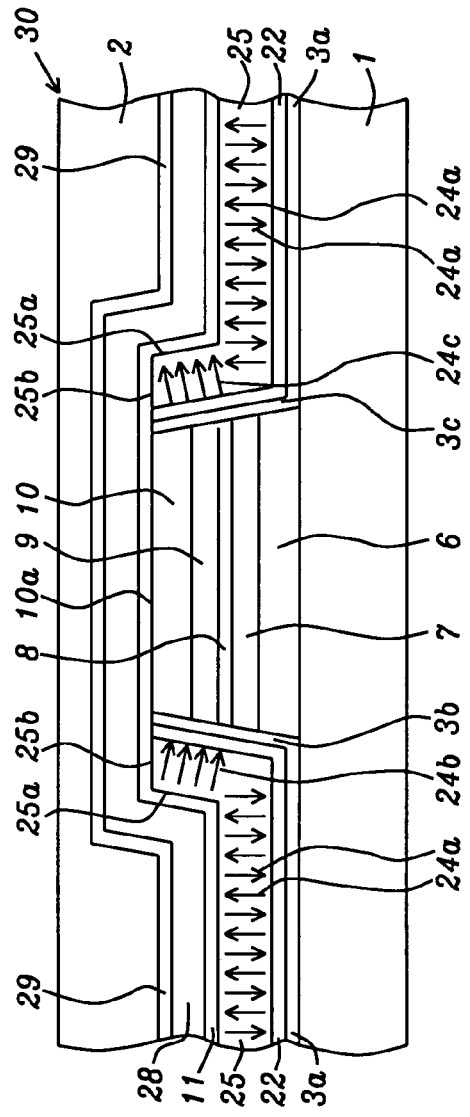
FIG. 16 is an embodiment wherein a soft magnetic layer and an overlying non-magnetic spacer are inserted between the capping layer and top shield in FIG. 8.
Figure 17:
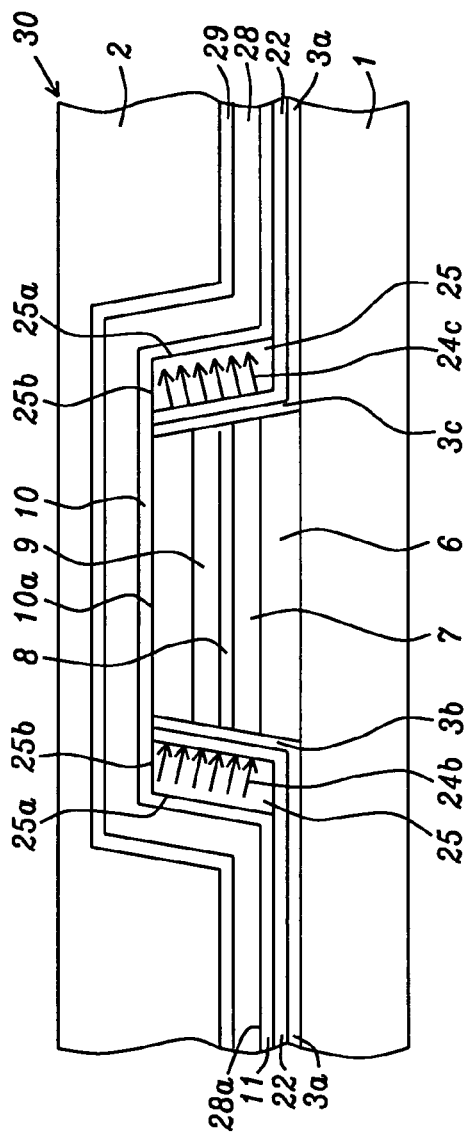
FIG. 17 is an embodiment wherein a soft magnetic layer and an overlying non-magnetic spacer are inserted between the capping layer and top shield in FIG. 9.

Referring to FIG. 16, the hard bias structure shown is the same as depicted in FIG. 8 except for insertion of the soft magnetic layer 28 and non-magnetic spacer 29 as described above. Likewise, the hard bias scheme illustrated in FIG. 17 differs from FIG. 9 because of the insertion of the soft magnetic layer 28 and non-magnetic spacer 29 between capping layer 11 and top shield 2. The top shield thickness may be decreased by an amount equivalent to the thickness of soft magnetic layer 28.

Referring to FIGS. 18 and 19, the hard bias structure in read head 30 is the same as shown in FIG. 10 and FIG. 11, respectively, except for the insertion of the soft magnetic layer 28 and overlying non-magnetic spacer 29 between the capping layer 11 and top shield 2. As a result, the soft magnetic layer-HB coupling interaction is by means of magneto-static coupling through the capping layer. In FIG. 18, the bottom surface 28a of the soft magnetic layer 28 and bottom surface 2a are lowered by a distance d relative to the x-axis and their position in FIG. 16. Likewise, in FIG. 19, the bottom surface 28a and bottom surface 2a are lowered by a distance d relative to their positions in FIG. 17. As a result, the soft magnetic layer 28 and top shield 2 afford greater protection against side reading in FIGS. 18-19 than in FIGS. 16-17.

A fourth series of four embodiments represented by FIGS. 20-23 are related to the second series of four embodiments (FIGS. 12-15) in that the various shapes and positions of the HB layer 25 remain the same as in the second series of embodiments. However, a soft magnetic layer 28 and an overlying non-magnetic spacer layer 29 that conform to the topography of HB layer 25 have been inserted between the HB layer and top shield 2 in FIGS. 20-23. The soft magnetic layer 28 and non-magnetic spacer 29 were previously described in the aforementioned embodiments. In addition, the HB images (not shown) are present in the soft magnetic layer 28 adjacent to sloped sides 25a as in the third series of embodiments. Note that the bottom surface 2a of the top shield still follows the topography of the HB layer 25 and remains parallel to the HB surfaces 25a, 25b. Non-magnetic spacer 29 breaks the exchange interaction between top shield 2 and soft magnetic layer 28. In this case, soft magnetic layer-HB coupling replaces top shield-HB coupling and occurs through direct exchange coupling to pin the HB magnetizations 24b, 24c in a direction perpendicular to the sidewalls 20, 21, respectively.

Referring to FIG. 20, the hard bias structure shown is the same as depicted in FIG. 12 except for insertion of the soft magnetic layer 28 and non-magnetic spacer 29 as described above. Likewise, the hard bias scheme illustrated in FIG. 21 differs from FIG. 13 because of the insertion of the soft magnetic layer 28 and non-magnetic spacer 29 between HB layer 25 and top shield 2. The top shield thickness may be decreased by an amount equivalent to the thickness of soft magnetic layer 28.

Figure 22:
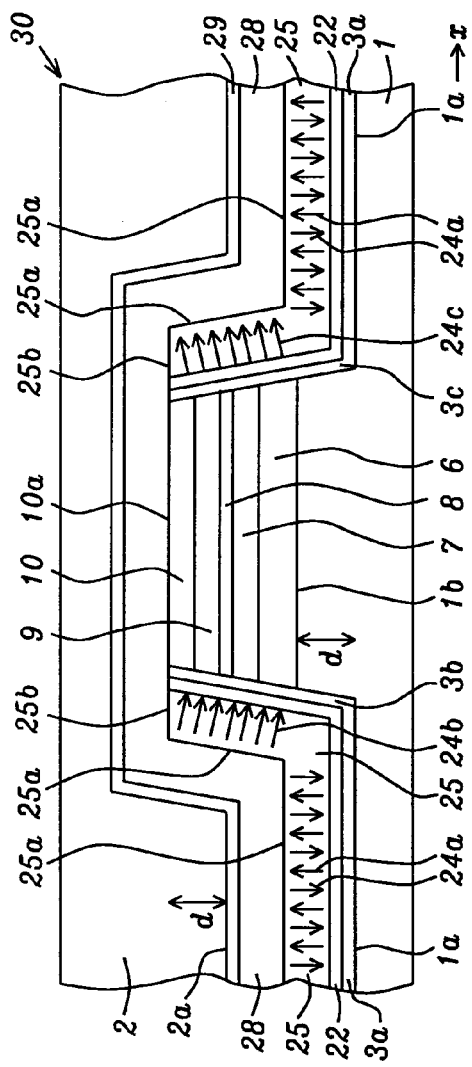
FIG. 22 is an embodiment of the present invention wherein the capping layer in FIG. 18 is removed to give direct contact between the HB layer and soft magnetic layer.
Figure 23:
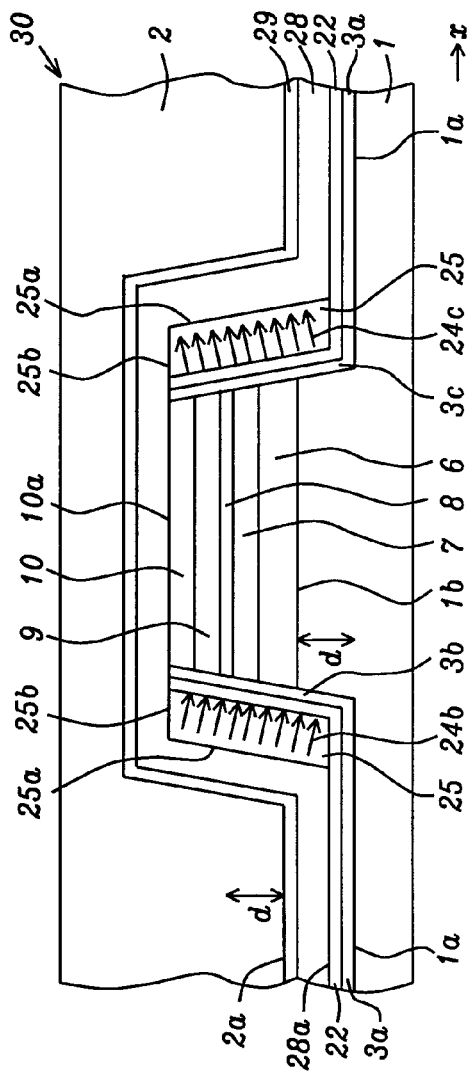
FIG. 23 is an embodiment of the present invention wherein the capping layer in FIG. 19 is removed to give direct contact between the HB layer and soft magnetic layer.

Referring to FIGS. 22 and 23, the hard bias structure in read head 30 is the same as shown in FIG. 14 and FIG. 15, respectively, except that regions of the HB layer 25 having magnetization 24a have been removed. As a result, the hard bias field provided by the HB regions having magnetization 24b is expected to be more stable than in FIGS. 14-15.

In summary, the HB embodiments disclosed herein provide several advantages over prior art. These advantages include the following: (1) optimum bias field at free layer; (2) higher coercivity; (3) greater stability against external field; (4) shield-HB coupling and topography to stabilize the bias field; (5) insensitivity to narrow shield-shield spacing; and (6) side shielding to prevent side reading from adjacent tracks. Each of these points is reviewed in the following paragraphs.

With regard to optimum bias field at the free layer, the highest surface charge density along the sidewall of the sensor stack is the saturation magnetization $M_S$ of the HB material and is achieved by growing the easy axis of the HB layer perpendicular to the seed layer as described herein. Compensation of the charges at the top surface of the HB layer through shield-HB coupling enables the $M_S$ near the sensor sidewalls to provide the theoretically highest bias field at the free layer. Moreover, the surface charges in the HB layer are adjacent to the sensor sidewalls which is the nearest HB location to the free layer edge. Therefore, the bias field gradient on the free layer edge relative to the free layer center is high and thereby helps to reduce free layer edge transient switching because of thermal agitation. The surface charge density according to the present invention is not affected by the slope angle of the sensor sidewall. On the other hand, in the conventional design shown in FIG. 1, the maximum surface charge of a perfectly longitudinally aligned HB layer is $M_S \sin\theta$, which depends on the slope angle $\theta$, of the sensor sidewall. However, for real read head structures, the charges are mainly located within the HB layer at substantial distances from the sensor sidewall where the solid angle is small and the effective HB field is lowered as a result. Thus, from a bias field point of view, the HB layer with perpendicular easy axis growth to the seed layer has an obvious advantage over the conventional longitudinal case.

On the topic of higher coercivity, the conventional in-plane growth of the HB layer easy axis enables the hard axis to be aligned very well vertically due to epitaxy growth from the seed layer, but the in-plane easy axis of HB grains is random in nature. For a randomly oriented in-plane easy axis, the effective anisotropy energy is $\{K_1\}=K1$ divided by the square root of N as stated in the following references: Y. Imry and S. Ma, Phys. Rev. Lett., 35, 1399(1975); G. Herzer, "Grain size dependence of coercivity and permeability in nanocrystalline ferromagnets", IEEE Trans. Magn. Vol. 26, p 1397 (1990); and R. O'Handley, "Modern Magnetic Materials: Principles and Applications", John Wiley & Sons, 1999, Chapters 9 and 12. In the aforementioned equation, K is the intrinsic anisotropy energy of the grains and N is the number of grains within the exchange range of the HB material. In a read head, HB grains are not well segregated by the non-magnetic grain boundaries which causes the exchange interaction between the grains to be high and the number of randomly oriented grains within the two dimensional exchange length to be not trivial. Therefore, for a conventional longitudinal HB scheme, the effective anisotropy energy could be much lower than the intrinsic energy of the grains. Additionally, as the critical grains that give rise to the biasing field are expected to be mainly located at the regions where the two growth patterns meet and where the amorphous phase is likely to occur, the anisotropy energy could be further down graded by the softness of the amorphous grains. Consequently, the HB field is expected to have even larger variations. To the contrary, the perpendicular easy axis growth according to the present invention minimizes the randomness of the easy axis orientation to within several degrees using a controlled epitaxy growth or super lattice growth as mentioned earlier. Thus, the effective anisotropy energy of the critical slope grains is the same as or close to the intrinsic anisotropy energy. Furthemore, with well controlled growth of the grains adjacent to the sensor slope, the amorphous phase is practically avoidable along the sensor slope and HB field variation is small. With the additional modifications of HB layer as described with respect to FIGS. 7a, 7b and incorporated in the embodiments represented by FIGS. 8-23, HB variation can be further improved.

Stability of the HB field against external fields is related to the fact that in-plane random easy axis orientation has a tendency for HB grain magnetization to be permanently altered by external fields. Due to easy axis randomness, HB magnetization of a cluster of grains defined by the exchange volume can have multiple low anisotropy directions that can easily result in the cluster being tilted by a small amplitude external field and not returning to its initial direction. This multiple easy axis scenario is especially detrimental if the cluster is contributing to the HB field, for example, on the boundaries of two lattice patterns, which causes HB field loss and sensor noise to increase during operation. As for the HB perpendicular easy axis (c-axis) growth of the present invention, the c-axis can be aligned within a deviation of several degrees. Therefore, even under a relatively high external field, but not one that is high enough to cause a magnetization switching, the magnetization of HB grains along the sensor sidewall will return to the original direction because of a lack of multiple easy axis directions. Thus, the HB structure described herein has a much higher stability against external field perturbations than prior art. Moreover, with shield-HB coupling that assists the perpendicular orientation of the HB magnetization near the sensor sidewalls, HB field stability against external fields is further enhanced.

A summary of the shield-HB coupling effect to stabilize the HB field is as follows. In conventional longitudinal HB schemes, shield-HB coupling should be as small as possible because such coupling will weaken the HB field strength and lead to sensor noise and instability. Prior art methods to achieve low coupling involve modifications such as increasing the distance between the top shield and HB layer by inserting a thick capping layer or by employing CMP to reduce shield topography and minimize HB imaging in the shield. Unfortunately, a greater distance between the top shield and HB layer is against the requirement of narrower shield-shield spacing in future high density magnetic recording devices. CMP is not only expensive and a yield detractor, but is also difficult to implement while fabricating small sensors with narrow shield-shield spacing. The HB structures of the present invention are compatible with top shield topography and take advantage of strong shield-HB coupling to improve the HB field thereby avoiding difficult and costly procedures like CMP. Instead, relatively easy process steps are employed that can be readily implemented in existing manufacturing schemes. For example, a thinning down of the HB capping layer and a uniform growth of the HB layer along the sensor sidewall and on the flat region above the bottom shield can be realized with current technologies.

With regard to the effect of HB layer thickness on HB field stability, conventional longitudinal HB schemes depend on the body charge for HB field which makes the HB field strength very sensitive to HB volume and means that HB layer thickness changes lead directly to HB field variation. The new HB structure and junction configuration disclosed herein is intended to make the HB field substantially independent of HB film thickness. As long as a crystalline structure can be maintained in the HB layer near the sensor sidewall and the shield-HB coupling or soft magnetic layer-HB coupling is sufficient to compensate the HB charges at the top surface of the HB layer, it is believed that bias field strength will be constant since the surface charge near the sensor sidewall will not vary. Strong shield-HB coupling or soft magnetic layer-HB coupling can be realized with a very thin capping layer on the HB layer and with top shield topography or soft magnetic layer topography closely following the HB layer shape. Maximum coupling strength takes place in embodiments where the top shield or soft magnetic layer contacts the HB layer and direct exchange coupling replaces magneto-static coupling through a capping layer.

Side shielding of the sensor stack is an extra feature provided by the HB configurations disclosed herein and can be optimized in certain embodiments by extending the sensor sidewalls into the bottom shield. This benefit is not available in conventional HB schemes since it is a by-product of promoting improved shield-HB coupling by way of strong topography in the top shield or in the soft magnetic layer when it is used to replace a portion of the top shield in the present invention.

While this invention has been particularly shown and described with reference to, the preferred embodiment thereof, it will be understood by those skilled in the art that various changes in form and details may be made without departing from the spirit and scope of this invention.

We claim:

1. A hard bias structure for providing a longitudinal bias field to a free layer in a magnetoresistive (MR) sensor having first and second sloped sidewalls and a top surface and formed on a substrate, said hard bias structure comprises a hard bias layer that has an easy axis growth perpendicular to an underlying seed layer formed along the sloped sidewalls wherein said hard bias layer has a top surface and comprises:
    (a) a hard bias region on a section of the seed layer along the first sloped sidewall that has a magnetization essentially perpendicular to and directed towards the first sloped sidewall; and
    (b) a hard bias region on a section of the seed layer along the second sloped sidewall that has a magnetization essentially perpendicular to and directed away from the second sloped sidewall.

2. The hard bias structure of claim 1 wherein the MR sensor is based on a giant magneto-resistive (GMR) or tunneling magneto-resistive (TMR) structure and a sense current for reading the sensor is provided by a current in-plane (CIP) or current perpendicular-to-plane (CPP) configuration.

3. The hard bias structure of claim 1 wherein said hard bias regions are comprised of hard magnetic material with crystalline anisotropy comprising CoCrPt, CoCrPtX, or TbFeCo where X is B, or O that can assist easy hard bias axis growth perpendicular to the seed layer.

4. The hard bias structure of claim 1 wherein the hard bias layer has a $[Co/Pt/Co]_n$ multilayer configuration where n is an integer $\geq 1$ and said hard bias layer is grown on a Pt seed layer, or wherein the hard bias layer has a [Co/Pd/Co]$_n$ multilayer configuration where n is an integer $\geq 1$ and said hard bias layer is grown on a Pd seed layer.

5. The hard bias structure of claim 1 wherein the seed layer may be a single layer or multilayer structure and has a top surface contacting the hard bias layer that is comprised of either an amorphous material or a material having a crystalline texture.

6. The hard bias structure of claim 5 wherein the seed layer is comprised of one or more of Ru, Ta, Ti, TiW, TiCr, Cr, CrV, CrMo, CrW, and Al.

7. The hard bias structure of claim 2 further comprised of an insulating layer formed on the substrate and on the two sensor sidewalls in order to avoid shorting of the sensor and wherein said seed layer is formed on the insulating layer.

8. The hard bias structure of claim 7 further comprised of a top shield formed on the top surfaces of said hard bias layer and sensor that substantially conforms to the topography of the hard bias layer and thereby exchange couples with the adjacent hard bias layer to compensate for surface charges at the top surface of the hard bias layer, and wherein said substrate is a bottom shield in a read head.

9. The hard bias structure of claim 8 wherein the two sensor sidewalls are extended into the bottom shield such that the sensor is formed on a first section of the bottom shield that has a greater thickness than other sections of the bottom shield which contact said insulating layer and do not contact said sidewalls.

10. The hard bias structure of claim 7 further comprised of a stack comprising a lower soft magnetic layer, a middle non-magnetic spacer, and an upper top shield that is formed on the hard bias layer, sensor, and portions of the underlying seed layer, and substantially conforms to the topography of the hard bias layer such that there is exchange coupling between the soft magnetic layer and hard bias layer to compensate for surface charges at the top surface of the hard bias layer, and wherein said substrate is a bottom shield in a read head.

11. The hard bias structure of claim 10 wherein the two sensor sidewalls are extended into the bottom shield such that the sensor is formed on a first section of the bottom shield that has a greater thickness than other sections of the bottom shield which are adjacent to said insulating layer.

12. The hard bias structure of claim 8 further comprised of a conformal capping layer formed between the top shield and top surfaces of the hard bias layer and sensor and between the top shield and portions of the seed layer wherein the capping layer has a certain thickness range to enable magneto-static coupling between the top shield and hard bias layer and thereby compensate for charges at the top surface of the hard bias layer.

13. The hard bias structure of claim 9 further comprised of a conformal capping layer between the top shield and top surfaces of the hard bias layer and sensor and between the top shield and a portion of the seed layer wherein the capping layer has a certain thickness range to enable magneto-static coupling between the top shield and hard bias layer and thereby compensate for charges at the top surface of the hard bias layer.

14. The hard bias structure of claim 10 further comprised of a conformal capping layer formed between the soft magnetic layer and top surfaces of the hard bias layer and sensor and between the soft magnetic layer and portions of the seed layer wherein the capping layer has a certain thickness range to enable magneto-static coupling between the soft magnetic layer and hard bias layer and thereby compensate for charges at the top surface of the hard bias layer.

15. The hard bias structure of claim 11 further comprised of a conformal capping layer between the soft magnetic layer and the top surfaces of the hard bias layer and sensor wherein the capping layer has a certain thickness range to enable magneto-static coupling between the soft magnetic layer and hard bias layer and thereby compensate for charges at the top surface of the hard bias layer.

* * * * *